(12) United States Patent
Bao et al.

(10) Patent No.: US 6,904,206 B2
(45) Date of Patent: Jun. 7, 2005

(54) WAFERLESS FIBER FABRY-PEROT FILTERS

(75) Inventors: Yufei Bao, Norcross, GA (US); Stephen K. Ferguson, Lawrenceville, GA (US); Donald Q. Snyder, Marietta, GA (US)

(73) Assignee: Micron Optics, Inc., Atlanta, GA (US)

( * ) Notice: Subject to any disclaimer, the term of this patent is extended or adjusted under 35 U.S.C. 154(b) by 0 days.

(21) Appl. No.: 10/686,934

(22) Filed: Oct. 15, 2003

(65) Prior Publication Data

US 2004/0247244 A1 Dec. 9, 2004

Related U.S. Application Data

(60) Provisional application No. 60/418,767, filed on Oct. 15, 2002.

(51) Int. Cl.[7] ................................. G02B 6/26
(52) U.S. Cl. ........................ 385/39; 385/28; 385/38; 385/79
(58) Field of Search ................ 385/28, 32–39, 385/79, 123, 124, 126; 372/6, 102

(56) References Cited

U.S. PATENT DOCUMENTS

| | | | |
|---|---|---|---|
| 3,984,190 A | 10/1976 | Barrett et al. | ................. 356/75 |
| 4,258,977 A | 3/1981 | Lukas | |
| 4,358,851 A | 11/1982 | Scifres | |
| 4,448,482 A | 5/1984 | Lathlaen | |
| 4,482,248 A | 11/1984 | Papuchon et al. | .......... 356/346 |
| 4,490,007 A | 12/1984 | Murata | |
| 4,530,097 A | 7/1985 | Stokes | |
| 4,545,644 A | 10/1985 | DeVeau, Jr. | |
| 4,629,284 A | 12/1986 | Malavieille | |
| 4,680,767 A | 7/1987 | Hakimi | |
| 4,780,877 A | 10/1988 | Snitzer | |
| 4,782,491 A | 11/1988 | Snitzer | |
| 4,787,701 A | 11/1988 | Stenger | |
| 4,806,012 A | 2/1989 | Meltz | |
| 4,813,756 A | 3/1989 | Frenkel | |
| 4,830,451 A | 5/1989 | Stone | ...................... 350/96.15 |
| 4,848,499 A | 7/1989 | Martinet | |
| 4,848,999 A | 7/1989 | Taylor | ........................... 65/4.3 |
| 4,861,136 A | 8/1989 | Stone et al. | ............... 350/96.3 |

(Continued)

FOREIGN PATENT DOCUMENTS

| | | | | |
|---|---|---|---|---|
| EP | 0 437 963 A2 | 7/1991 | ............ | G01J/3/26 |
| EP | 0 457 484 A2 | 11/1991 | ............ | G02B/6/26 |

(Continued)

OTHER PUBLICATIONS

Arya, V. et al. "Temperature Compensation Scheme for Refractive Index Grating–Based Optical Fiber Devices," SPIE 2594:52–59.

(Continued)

*Primary Examiner*—Phan T. H. Palmer
(74) *Attorney, Agent, or Firm*—Greenlee, Winner and Sullivan, P.C.

(57) ABSTRACT

Improved fiber Fabry-Perot (FFP) filter configurations are provided in which at least one of the mirror-ended fiber ends forming the FFP has a concave fiber core end. The mirror at that fiber core end is thus concave. The invention provides waferless FFP configurations in which the FFP cavity is an air-gap cavity formed by two highly reflective dielectric mirrors deposited directly on optical fiber ends. The air gap cavity can be tuned using various methods to tune the filter. Use of a concave mirror at the fiber core enables filters with improved performance characteristics: including very wide FSR (>12000 GHz), very high finesse (>5,000), and high glitch-free dynamic range (GFDR) (>40 dB). The invention also provides improved wafer-based FFP fixed and tunable filters that incorporate a concave mirror at a fiber core forming the FFP cavity and a fiber (SMF) waveguide within the cavity.

59 Claims, 10 Drawing Sheets

U.S. PATENT DOCUMENTS

| | | |
|---|---|---|
| 4,892,388 A | 1/1990 | Taylor |
| 4,923,273 A | 5/1990 | Taylor |
| 4,932,033 A | 6/1990 | Miyazawa |
| 4,955,025 A | 9/1990 | Mears |
| 4,982,406 A | 1/1991 | Facklam |
| 4,996,419 A | 2/1991 | Morey |
| 5,007,705 A | 4/1991 | Morey |
| 5,024,505 A | 6/1991 | Fujikawa et al. ........ 350/96.22 |
| 5,027,435 A | 6/1991 | Chraplyvy et al. ......... 455/617 |
| 5,037,176 A | 8/1991 | Roberts et al. ............... 385/16 |
| 5,037,179 A | 8/1991 | Bertolin |
| 5,037,180 A | 8/1991 | Stone ......................... 385/123 |
| 5,042,898 A | 8/1991 | Morey |
| 5,050,949 A | 9/1991 | DiGiovanni |
| 5,062,684 A | 11/1991 | Clayton |
| 5,073,004 A | 12/1991 | Clayton |
| 5,115,441 A | 5/1992 | Kopf |
| 5,132,976 A | 7/1992 | Chung |
| 5,146,527 A | 9/1992 | Mallinson |
| 5,159,655 A | 10/1992 | Ziebol |
| 5,179,608 A | 1/1993 | Ziebol |
| 5,181,213 A | 1/1993 | Shinokura |
| 5,208,886 A | 5/1993 | Clayton |
| 5,212,745 A | 5/1993 | Miller |
| 5,212,746 A | 5/1993 | Miller |
| 5,227,857 A | 7/1993 | Kersey |
| 5,237,630 A | 8/1993 | Hogg |
| 5,243,610 A | 9/1993 | Murata |
| 5,251,275 A | 10/1993 | Kuriyama et al. ............. 385/14 |
| 5,283,845 A | 2/1994 | Ip ............................... 385/24 |
| 5,289,552 A | 2/1994 | Miller |
| 5,301,201 A | 4/1994 | Dutta |
| 5,305,336 A | 4/1994 | Adar |
| 5,359,687 A | 10/1994 | McFarland et al. ........... 385/49 |
| 5,361,130 A | 11/1994 | Kersey |
| 5,365,539 A | 11/1994 | Mooradian |
| 5,367,589 A | 11/1994 | MacDonald |
| 5,375,181 A | 12/1994 | Miller |
| 5,380,995 A | 1/1995 | Udd |
| 5,381,230 A | 1/1995 | Blanke |
| 5,381,426 A | 1/1995 | Fontana |
| 5,381,500 A | 1/1995 | Edwards |
| 5,397,739 A | 3/1995 | Chalmers |
| 5,397,891 A | 3/1995 | Udd |
| 5,401,956 A | 3/1995 | Dunphy |
| 5,410,404 A | 4/1995 | Kersey |
| 5,422,470 A | 6/1995 | Kubo |
| 5,422,970 A | 6/1995 | Miller |
| 5,425,039 A | 6/1995 | Hsu |
| 5,426,297 A | 6/1995 | Dunphy |
| 5,469,455 A | 11/1995 | Reitz |
| 5,469,520 A | 11/1995 | Morey |
| 5,504,771 A | 4/1996 | Vahala |
| 5,509,093 A | 4/1996 | Miller |
| 5,513,913 A | 5/1996 | Ball |
| 5,530,715 A | 6/1996 | Shieh |
| 5,563,973 A | 10/1996 | Miller |
| 5,588,013 A | 12/1996 | Reitz |
| 5,591,965 A | 1/1997 | Udd |
| 5,602,949 A | 2/1997 | Epworth ...................... 385/37 |
| 5,615,224 A | 3/1997 | Cohen |
| 5,617,434 A | 4/1997 | Tamura |
| 5,619,368 A | 4/1997 | Swanson |
| 5,650,856 A | 7/1997 | Morse |
| 5,666,373 A | 9/1997 | Sharp |
| 5,682,237 A | 10/1997 | Belk |
| 5,694,503 A | 12/1997 | Fleming |
| 5,703,978 A | 12/1997 | DiGiovanni |
| 5,721,802 A | 2/1998 | Francis |
| 5,732,169 A | 3/1998 | Riant |
| 5,734,667 A | 3/1998 | Esman |
| 5,739,945 A | 4/1998 | Tayebati ...................... 359/291 |
| 5,796,894 A | 8/1998 | Csipkes et al. ............... 385/56 |
| RE35,962 E | 11/1998 | Ball |
| 5,838,437 A | 11/1998 | Miller |
| 5,841,920 A | 11/1998 | Lemaire |
| 5,878,065 A | 3/1999 | Delavaux |
| 5,887,099 A | 3/1999 | Csipkes et al. ............... 385/56 |
| 5,892,582 A | 4/1999 | Bao |
| 5,896,193 A | 4/1999 | Colbourne |
| 5,914,978 A | 6/1999 | Welch |
| 5,946,438 A | 8/1999 | Minot |
| 5,959,753 A | 9/1999 | Duling |
| H1813 H | 11/1999 | Kersey |
| 5,978,539 A | 11/1999 | Davies et al. ............... 385/129 |
| 5,991,483 A | 11/1999 | Engelberth ................... 385/37 |
| 5,999,671 A | 12/1999 | Jin et al. ...................... 385/37 |
| 6,044,189 A | 3/2000 | Miller |
| 6,097,530 A | 8/2000 | Asher et al. ................ 359/288 |
| 6,113,469 A | 9/2000 | Yoshikawa et al. ........... 451/41 |
| 6,115,122 A | 9/2000 | Bao |
| 6,137,812 A | 10/2000 | Hsu |
| 6,160,627 A | 12/2000 | Ahn |
| 6,163,553 A | 12/2000 | Pfeiffer |
| 6,181,851 B1 | 1/2001 | Pan et al. ...................... 385/37 |
| 6,229,827 B1 | 5/2001 | Fernald et al. .............. 372/112 |
| 6,240,220 B1 | 5/2001 | Pan et al. ...................... 385/13 |
| 6,241,397 B1 | 6/2001 | Bao |
| 6,263,002 B1 | 7/2001 | Hsu |
| 6,327,036 B1 | 12/2001 | Bao et al. .................... 356/480 |
| 6,445,838 B1 | 9/2002 | Caracci et al. ................ 385/14 |
| 6,449,047 B1 | 9/2002 | Bao |
| 6,504,616 B1 | 1/2003 | Haber |
| 6,529,661 B2 * | 3/2003 | Kropp .......................... 385/38 |
| 6,671,432 B2 * | 12/2003 | Imada et al. .................. 385/33 |

FOREIGN PATENT DOCUMENTS

| | | | | |
|---|---|---|---|---|
| EP | 0 721 121 A1 | 7/1996 | ........... G02B/6/293 |
| EP | 0 903 615 A2 | 3/1999 | ............. G02F/1/21 |
| EP | 1 016 884 A2 | 7/2000 | ............. G02B/6/28 |
| WO | WO 98/17968 | 4/1998 | ............. G01B/9/02 |
| WO | WO 98/27446 | 6/1998 | |
| WO | WO 99/34484 | 7/1999 | |
| WO | WO 00/07047 | 2/2000 | |
| WO | WO 00/28355 | 5/2000 | ............. G02B/6/00 |
| WO | WO 00/39617 | 7/2000 | |

OTHER PUBLICATIONS

Arya, V. et al. (1997), "Application of Thin–Film Optical Filters to the Temperature Compensation of Optical Fiber Grating–Based Devices," IEEE Trans Instrum. Measurement 46(5):1173–1177.

Ball, G.A. and Morey, W.W., (Dec. 1994), "Compression–tuned single–frequency Bragg grating fiber laser," Optics Letters 19(23):1979–1981.

Barnes et al., (Sep. 1989), "High–quantum–efficiency $Er^{3+}$ fiber lasers pumped at 980 nm," Optics Letters 14(18):1002–1004.

Barnes et al. (1989), "Q–switching in fibre lasers," *Fiber Laser Sources and Amplifiers Proc. SPIE* 1171:302–308.

Bellemare et al. (Feb. 1999), "Multifrequency Erbium–Doped Fiber Ring Lasers Anchored on the ITU Frequency Grid," *Optical Fiber Communications (OFC/IOOC'99)* Feb. 21–26, 1999, San Diego, CA 1:16–18.

Bird et al., (1991), "Narrow line semiconductor laser using fibre grating," Electron Lett. 27:1115–1116.

Boucher, R. et al. (1992), "Calibrated Fabry–Perot etalon as an absolute frequency reference for OFDM communications," IEEE Photonics Technol. Lett. 4:801–803.

Farries, M.C. et al. (1998), "Hybrid DWDM devices utilizing dielectric filters and fiber Bragg gratings," OFC '98 Optical Fiber Communication Conf. and Exhibit, Technical Digest Series, vol. 2, Feb. 22–27, 1998, San Jose, CA, pp. 234–235.

Foote, P.D. (1994), "Fibre Bragg Grating Stain Sensors for Aerospace Smart Structures," Second European Conf. on Smart Structures and Materials, Glasgow, U.K., session 8, p. 290–293.

Friebele, E.J. et al. (1994), "Fiberoptic Sensors measure up for smart structures," Laser Focus World, (May), pp. 165–169.

Gamache et al. (Feb. 1996), "An Optical Frequency Scale in Exact Multiples of 100 GHz for Standardization of Multifrequency Communications," *IEEE Photon. Technol. Lett.* 8(2):290–292.

Gehrsitz, S. et al. (Aug. 1997), "Tandem Triple–Pass Fabry–Perot Interferometer for Applications in the Near Infrared," Appl. Opt. (36):5355–5361.

Giles et al., (Aug. 1994), "Reflection–induced changes in the optical spectra of 980 nm QW lasers," IEEE Photonics Technology Lett 6(8):903–906.

Giles et al., (Aug. 1994), "Simultaneous wavelength–stabilization of 980 nm pump lasers," IEEE Photonics Technology Lett. 6(8):907–909.

Glance, B.S. et al. (1988), "Densely spaced FDM coherent star network with optical signals confined to equally spaced frequencies," IEEE J. Lightwave Technol. LT–6:1770–1781.

Hammon, T.E. and Stokes, A.D. (1996), "Optical fibre Bragg grating temperature sensor measurements in an electrical power transformer using a temperature compensated optical fibre Bragg grating as a reference," Eleventh Int'l. Conf. on Optical Fiber Sensors—Advanced Sensing Photonics, Part vol. 1, pp. 566–569 (Abstract Only).

Henriksson, A. et al. (1996), "Temperature insensitivity of a fiber optic Bragg grating sensor," Proc. SPIE 2839:20–33.

Hsu, K. and Miller, C.M., (Jun. 1994), "Single–mode tunable erbium:ytterbium fiber Fabry–Perot microlaser," Optics Letters 19(12):886–888.

Hsu, K. and Miller, C.M., (Feb. 1995), "Continuous and discrete wavelength tuning in Er:Yb fiber Fabry–Perot lasers," Optics Letters 20(4):377–379.

Humblet, P.A. et al. (Aug. 1990), "Crosstalk Analysis and Filter Optimization of Single–and Double–Cavity Fabry–Perot Filters," IEEE J. on Selected Areas in Communications 8(6):1095–1107.

Iwashima, T. et al. (1997), "Temperature compensation technique for fibre Bragg gratings using liquid crystalline polymer tubes," Electron. Lett. 33(5):417–419.

Ja, Y.H. (Sep. 1995) "Optical Vernier Filter with Fiber Grating Fabry–Perot Resonators," Appl. Opt. 34(27):6164–6167.

Kaminow, I.P. et al. (1989), "A Tunable Vernier Fiber Fabry–Perot Filter for FDM Demultiplexing and Detection," IEEE Photonics Technol. Lett. 1(1):24–26.

Kersey, A.D. (1993), "Fiber–optic Bragg grating strain sensor with drift–compensated high–resolution interferometric wavelength–shift detection," Opt. Lett. 18(1):72–74.

Kersey, A.D. et al. (1993), "Multiplexed fiber Bragg grating strain–sensor system with a fiber Fabry–Perot wavelength filter," Opt. Lett. 18:1370–1372.

Kersey, A.D. et al. (1995), "Development of Fiber Sensors for Structural Monitoring," SPIE 2456:262–268.

Kersey, A.D. (1996), "Interrogation and Multiplexing Techniques for Fiber Bragg Grating Strain–Sensors," Optical Sciences Division, Naval Research Laboratory (NRL) code 5674, distributed by NRL at SPIE Meeting, Fall 1996, (Denver, CO).

Krüger et al. (Apr. 1997), "Quasicontinuous Tunable Fiber–Ring Laser Applied as Local Oscillator in an Absolute Calibrated Spectrometer for WDM Systems," *J. Lightwave Technol.* 15:628–635.

Liu, Y. et al. (1997), "Temperature insensitive fiber grating," Chinese J. of Lasers 24(10):895–898 (Abstract Only).

Lindsay, S.M. et al. (1981) "Construction and Alignment of a High Performance Multipass Vernier Tandem Fabry–Perot Interferometer," Rev. Sci. Instrum. 52(10):1478–1486.

Lemieux, J–F. Et al. (May 1999), "Step–tunable (100GHz) Hybrid Laser Based on Vernier Effect Between Fabry–Perot Cavity and Sampled Fibre Bragg Grating," Electron. Lett. 35(11):904–906.

Lemieux, J–F. et al. (Jul. 1999), "100 Ghz Frequency Step–Tunable Hybrid Laser Based on a Vernier Effect Between Fabry–Perot Cavity and Sampled Fibre Bragg Grating." OSA Trends in Optics and Photonics. Advanced Semiconductor Lasers and Their Applications, vol. 31, from the Topical Meeting Editor(s): Hollberg, L. and Lang, R.J., Optical Soc. America, Washington, DC, USA, pp. 186–188.

Liou et al. (Dec. 1998), "A 24–Channel Wavelength–Selectable Er–Fiber Ring Laser with Intracavity Waveguide–Grating–Router and Semiconductor Fabry–Perot Filter," *IEEE Photon. Technol. Lett.* 10(12):1787–1789.

Martin, J. et al. (1997), "Use of a sampled Bragg grating as an in–fiber optical resonator for the realization of a referencing optical frequency scale for WDM communications," Optical Fiber Communication Conference OFC–97, Technical Digest, paper ThI5, pp. 284–285.

Miller, C.M. et al. (1992), "Wavelength–Locked, Two–Stage Fibre Fabry–Perot Filter for Dense Wavelength Division Demultiplexing in Erbium–Doped Fibre Amplifier Spectrum," Electron. Lett. 28(3):216–217.

Nyman, B., (Sep. 1998), "Four Measurement Methods Characterize WDM Components," Optoelectronics World, pp. 527–532.

Olsson et al. (Feb. 1985), "Chirp–free transmission over 82.5 km of single mode fibers at 2 Gbit/s with injection locked DFB semiconductor lasers," J. Lightwave Technology LT–3(1):63–66.

Oretga, B. et al. (Jul. 1999), "Wavelength Division Multiplexing All–Fiber Hybrid Devices Based on Fabry–Perot's and Gratings," J. Lightwave Technol. 17(7):1242–1247.

Park et al. (Nov. 1991), *"All Fiber, low threshold, widely tunable single–frequency, erbium–doped fiber ring laser with a tandem fiber Fabry–Perot filter," Appl. Phys. Lett.* 59:2369–2371.

Park et al. (Jun. 1993), *"Frequency locking of an erbium–doped fiber ring laser to an external fiber Fabry–Perot resonator," Optics Lett.* 18(11):879–881.

Poulsen, C.V. and Sejka, M. (Jun. 1993), "Highly Optimized Tunable $Er^{3+}$–Doped Single Longitudinal Mode Fiber Ring Laser, Experiment and Model," *IEEE Photonics Technol. Lett.* 5:646–648.

Rao, Y–J. and Jackson, D.A. (1996), "Universal Fiber–Optic Point Sensor System for Quasi–Static Absolute Measurements of Multiparameters Exploiting Low Coherence Interrogation," J. Lightwave Technol. 14(4):592–600.

Rao, Y–J. (19960, "Strain sensing of modern composite materials with a spatial–wavelength–division multiplexed fiber grating network," Opt. Lett. 21(9):683–685.

Sakai, T. et al. (1992), "Frequency stabilization of laser diodes using 1.51–1.55 μm absorption lines of $^{12}C_2H_2$ and $^{13}C_2H_2$." IEEE J. Quant. Electron. 28:75–81.

Stone, J. and Marcuse, D. (1986), "Ultrahigh finesse fiber Fabry–Perot interferometers," IEEE J. Lightwave Technol. LT–4:382–385.

Stone J. et al. (1987) Elect. Lett. 23(15):781–783.

Wyatt et al., (1982), "Megahertz linewidth from a 1.5 μm semiconductor laser with HeNe laser injection," Electron. Lett. 18:292–293.

Yamashita et al., (Aug. 1997), "Miniature erbium:ytterbium fiber Fabry–Perot multiwavelength lasers," IEEE J. Selected Topics in Quantum Electronics 3(4):1058–1064.

Yamashita, S. and Cowle, G.J., (Sep. 1998), "Single–polarization operation of injection locked fiber DFB lasers," CTuF6 European Conference on Lasers and Electro–Optics '98, Glasgow, Scotland, Sep. 13–18, 1998.

Yamashita, S. and Cowle, G.J., (Mar. 1999), "Single–polarization operation of fiber distributed feedback (DFB) lasers by injection locking," J. Lightwave Technology 17(3):509–513.

Yoffe, G.W. et al. (1995) "Passive temperature–compensating package for optical fiber gratings" Applied Optics 34(30):6859–6861.

Yoffe, G.W. et al. "Temperature–compensated optical–fiber Bragg gratings" OFC '95 Technical Digest, W14–pp. 134–135.

Yoffe, G.W. et al. (1994), "Temperature–Compensating Mounts for Optical Fibre Biagg Gratings" ACOFT '94, pp. 262–265.

Yun et al., (Jun. 1998), "Interrogation of Fiber Grating Sensor Arrays with a Wavelength–swept Fiber Laser," Optics Letters 23(11):843–845.

Zervas, M.N. and Giles, I.P., (1989), "Optical–fibre surface–plasmon–wave polarisers with enhanced performance," Electron. Lett. 25:321–323.

Zhang et al. (Jan. 1996), *"Stable Single–Mode Compound–Ring Erbium–Doped Fiber Laser,"* IEEE J. Lightwave Technol. 14 (1):104–109.

Ball and Morey (Dec. 1994), "Compression–tuned single–frequency Bragg grating fiber laser," Opt. Lett. 19(23): 1979–1981.

Hill and Meltz (Aug. 1997), "Fiber Bragg grating technology fundamentals and overview," J. Lightwave Technology 15(8): 1263–1276.

Iocco et al. (Sep. 1998), "Tension and compression tuned Bragg grating filter," Proc. ECOC '98, vol. 1:229–230.

Iocco et al. (Jul. 1999), "Bragg grating fast tunable filter for wavelength division multiplexing," J. Lightwave Technology 17(7): 1217–1221.

Boucher, R. et al. (1992), "Calibrated Fabry–Perot Etalon as an Absolute Frequency Reference for OFDM Communications," IEEE Photon. Tech. Lett. 4(7):801–803.

Davis, M.A. and Kersey, A.D. (1995), "Matched–filter interrogation technique for fibre Bragg grating arrays," Electron. Lett. 31(10):822–823.

Davis, M.A. and Kersey, A.D. (1994), "All–fibre Bragg grating strain–sensor demodulation technique using a wavelength division coupler," Electron. Lett. 30(1):75–77.

Dunphy, J. et al. (1993), "Instrumentation development in support of fiber grating sensor arrays," Proc. of the SPIE V. 2071, pp. 2–11.

Foote, P.D. (1994), "Fibre Bragg Grating Strain Sensors for Aerospece Smart Structures," Second European Conf. on Smart Structures and Materials, Glasgow, Session 8, pp. 290–293.

Friebele, E.J. and Kersey, A.D. (1994), "Fiberoptic sensors measure up for smart structures," Laser Focus World, pp. 165–169.

Gamache, C. et al. (1996), "An Optical Frequency Scale in Exact Multiples of 100 GHz for Standardization of Multifrequency Communications," IEEE Photon. Tech. Lett. 8(2):290–292.

Glance, B.S. et al. (1988), "Densely Spaced FDM Coherent Star Network With Optical Signals Confined to Equally Spaced Frequencies," J. Lightwave Technol. 6(11):1770–1781.

Jackson, D.A. et al. (1993), "Simple multiplexing scheme for a fiber–optic grating sensor network" Opt. Lett. 19(14):1192–1194.

Jackson, D.A. et al. (1993), Pseudoheterodyne Detection Scheme for Optical Interferometers Electron. Lett. 18(25):1081–1083.

Kersey, A.D. et al., "Development of Fiber Sensors for Structural Monitoring," SPIE 2456:262–268.

Kersey, A.D. et al. (1993), "Multiplexed fiber Bragg grating strain–sensor system with a fiber Fabry–Perot wavelength filter," Opt. Lett. 18(16):1370–1372.

Kersey, A.D. "Interrogation and Multiplexing Techniques for Fiber Bagg Grating Strain–Sensors," Optical Sciences Division Naval Research Laboratory (NRL) code 5674, distributed by NRL at SPIE Meeting Fall 1996, Denver, CO.

Kersey, A.D. et al. (1992), "High–Resolution Fibre–Grating Based Strain Sensor With Interferometric Wavelength–Shift Detection" Electron. Lett. 28(3):236–238.

Kersey, A.D. et al. (1993), "Fiber–optic Bragg grating strain sensor with drift–compensated high–resolution interferometric wavelength–shift detection" Opt. Lett. 18(1):72–74.

Martin, J. et al. (1997), "Use of a sampled Bragg grating as an in–fiber optical resonator for the realization of a referencing optical frequency scale for WDM communications," OFC '97 Technical Digest, pp. 284–285.

Melle, S.M. et al. (1993), "A Bragg Grating–Tuned Fiber Laser Strain Sensor System" IEEE Photon. Technol. Lett. 5(2):263–266.

Miller, C.M., "Characteristics and Applications of High Performance, Tunable, Fiber Fabry–Perot Filters," 41st ECTC Electronics Components & Technology Conf., Atlanta, GA, May 13–15, 1991, 4 pp.

Rao, Y.–j. and Jackson, D.A. (1996), "Universal Fiber–Optic Point Sensor System for Quasi–Static Absolute Measurements of Multiparameters Exploiting Low Coherence Interrogation," J. Lightwave Technol. 14(4):592–600.

Rao, Y.–j. et al. (1996), "Strain sensing of modern composite materials with a spatial/wavelength–division multiplexed fiber grating network," Opt. Lett. 21(9):683–685.

Rao, Y-j. et al. (1995), "Spatially-multiplexed fibre-optic Bragg grating strain and temperature sensor system based on interferometric wavelength-shift detection" Electron. Lett. 31(12):1009–1010.

Sakai, Y, et al. (1992), "Frequency Stabilization of Laser Diodes Using 1.51–1.55 µm Absorption Lines of $^{12}C_2H_2$ and $^{13}C_2H^2$," IEEE J. Quantrum Electron 28(1): 75–81.

Weis, R.S. et al. (1994), "A Four-Element Fiber Grating Sensor Array with Phase-Sensitive Detection," IEEE Photon. Technol. Lett. 6(12):1469–1472.

Xu, M.-G. et al. (1993), "Novel frequency-agile interrogating system for fibre Bragg grating sensor," Proc. of the SPIE V, 2071, pp. 59–65.

* cited by examiner

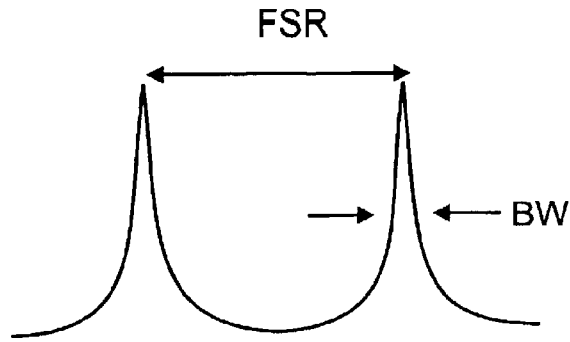

FIG. 3A

Optical frequency or optical wavelength spacing between two adjacent resonance modes (adjacent peaks).

Finesse $$F = \frac{\pi \cdot \sqrt{R}}{1-R} = \frac{Free\_Spectral\_Range(FSR)}{Bandwidth(BW)}$$

With R = Mirror reflectance and BW = Full Width Half Maximum (FWHM) of the resonance peak.

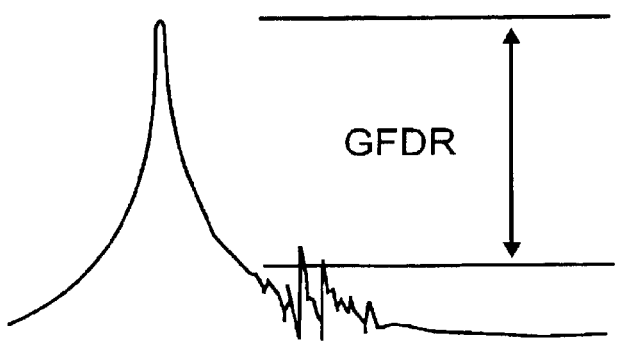

FIG. 3B

Definition of Glitch free dynamic range (GFDR). The GFDR of the tunable filter is defined as the ratio of the peak value of the resonance mode to the value of the peak spurious spectral content (measured over the entire FSR). GFDR is expressed relative to the signal amplitude (dBc).

(A) An FFP formed by two mirrors with double concave profile in core and cladding,
(B) An FFP formed by mirrors with single concave profile in core and cladding.

Cross-sectional fiber end profile with a double concave profile

Illustrates a wafered FFP filter formed with a mirror-ended fiber in which the fiber end has a double concave profile of the fiber core end and the cladding end.

FFPs formed with fibers having different core and cladding end cross-sectional profiles.

Preferred Combinations for FFPS

Figure 7 illustrates an experimentally determined cross-sectional profile of a fiber end (double concave) as measured using an optical profiler Wyko®FOT(TM) Veeco Instruments, Woodbury NY.

WAFERLESS FIBER FABRY-PEROT FILTERS

CROSS-REFERENCE TO RELATED APPLICATIONS

This application claims priority under 35 U.S.C. 119(e) to provisional patent application 60/418,767, filed Oct. 15, 2002, which is hereby incorporated by reference in its entirety to the extent not inconsistent with the disclosure herein.

BACKGROUND OF THE INVENTION

A Fabry-Perot (FP) filter is made of a pair of mirrors separated by a selected optical path length which form the resonance cavity of the filter. A FP filter passes a narrow band of light determined by the reflectivities of its mirrors which satisfy a resonance condition such that when the optical length of the round-trip length of the cavity is an integer of a wavelength, then that wavelength together with a narrow band resonates inside the cavity, and passes through the filter with no (theoretically) or very low loss.

For a fixed FP cavity length, the resonant wavelength changes periodically. The period of the resonant wavelength is called free spectral range (FSR) of the filter. FIG. 3A is a representative FP filter output which illustrates the definitions of FSR and bandwidth (BW) of such a filter. Finesse ($\mathscr{F}$) is a function of BW and FSR and is expressed as: $\mathscr{F}$=FSR/BW. FIG. 3B illustrates the glitch free dynamic range (GFDR) of a filter. The GFDR characterizes the level of the undesired multi-mode FP structure relative to the fundamental mode transmission peak, and is defined as the ratio of the peak value of the resonance mode to the value of the peak spurious spectral content (measured over the entire FSR).

By changing cavity length, the FSR of an FP filter can be changed, and the resonant wavelength can be tuned. Three types of FP tunable filters are typically used in fiber-optic communications. One is a lensed FP interferometer, another is a microelectromechanical system based FP filter (MEMS-FP filter), and the other is an all fiber FP interferometer.

In a lensed FP filter, the light propagating inside a single-mode fiber is first collimated by a (Gradient Index) GRIN lens, then enters a bulk optic FP cavity, and the transmitted wavelength is coupled back to a single mode fiber by another GRIN lens. The expanded beam size of such a filter results in reduced stability and optical performance, and also limits the filter FSR that can be achieved. A MEMS-FP filter uses curved and suspended dielectric mirrors, and as a result tends to suffer from mechanical and thermal instabilities.

An all fiber Fabry-Perot tunable filter (FFP-TF), illustrated in FIG. 1, is an all-fiber device that consists of two mirrors (10 and 12) deposited directly onto fiber ends (9 and 11, respectively), a single-mode fiber (SMF) waveguide (20, 5 $\mu$m to 10 mm in length, also called a wafer) of selected length, bonded to one mirror (10. the embedded mirror). The internal end of the wafer (13) and the mirror-ended fiber end (11) are spaced apart to form a 1–2 $\mu$m air-gap (21) within the cavity. To provide tunability, a FFP may be designed such that the length of the air gap in the resonance cavity may be selectively adjusted to tune the filter. The FFP configuration of FIG. 1 is illustrated as a fiber ferrule assembly in which fibers (5 and 7) each having a fiber core (22) and fiber cladding (23) are fixed within the axial bores of ferrules (1 and 3). Wafer 20 is formed by aligning and bonding the ends of two ferrule confined fibers and cutting one to the desired wafer length to provide the wafer (20) bonded to the ferrule (1). The entire optical configuration is aligned within a fixture or holder which maintains fiber alignment and allows the cavity length to be tuned without significant loss of alignment. For example, the holder is provided with a piezoelectric actuator (PZT) to allow the cavity length to be changed and, thus, provide wavelength tuning and control with positioning accuracy of atomic dimensions.

FIG. 2 provides a schematic illustration of an alignment/tuning fixture 40 for FFP filters. Ferrules 1 and 3 (containing fibers 5 and 7, respectively) are held within ferrule holders 35 and 37 of fixture 40 with internal ends aligned and spaced apart to form the air gap. Ferrule holders 35 and 37, into which the ferrules are inserted and held in alignment, are attached on either side of a PZT element (36) which changes its length (along its axis 25) on application of a voltage. The PZT element (36) has an axial bore into which the ferrules extend and within which the FFP cavity is formed. Fixed frequency Fiber Fabry-Perot filters with a resonance cavity having a fixed optical path length have also been described.

Examples of fixed and tunable FFP filters and holders for alignment and tuning of such filters are provided in U.S. Pat. Nos. 5,212,745; 5,212,746; 5,289,552; 5,375,181; 5,422,970; 5,509,093; 5,563,973; 6,241,397; and U.S. patent application Ser. No. 10/233,011. Fixed frequency and tunable FFP filters have various applications in the fields of sensing and telecommunications as exemplified in U.S. patents including 5,892,582; 6,115,122; 6,327,036; 6,449,047; 6,137,812; 5,425,039; 5,838,437; and U.S. patent application Ser. Nos. 09/633,362; 09/505,083; 09/669,488. All of which are incorporated by reference in their entireties herein to the extent that they are not inconsistent with the present application.

FFP-TFs are robust and field-worthy compared to lensed and microelectromechanical Fabry-Perot interferometers. The key to the stable, high performance characteristics of the all-fiber filters is the presence of the internal SMF waveguide (wafer) that provides intra-cavity waveguiding, eliminates extraneous cavity modes, and eases mirror alignment required for high-finesse and low-loss operation. Total fiber length inside the wafer or waveguide within the FFP cavity ranges from a few micrometers to a few millimeters for telecommunication components. An important characteristic of FFP-TFs is the high accuracy with which measured response corresponds to theoretical response. However, due to the high precision requirements for making a wafer or waveguide of selected length, it becomes very difficult to fabricate wafered cavity filters with wide-FSR (>100 nm).

To maximally utilize the channeling capacity that single mode optical fibers can offer, the telecom industry is exploring systems that utilize wavelengths at both C (central) and L (long) bands (1520–1620 nm), and will soon expand these systems to the S (short) band (1420–1520 nm). One application for FFP tunable filters is as spectrum analyzers for channel and performance monitoring in a network. In order to monitor both the C and L bands, the FSR of the filter should be greater than about 115 nm. To achieve such a wide FSR in an FFP-TF configuration using a wafered cavity, a wafer length of less than about 3.5 micron is needed. In addition to the difficulties inherent in the reproducible manufacture of fiber wafers of short and precise length, the beam shaping effect of the wafer decreases with its length and as a result filters having such short wafers can exhibit high sensitivity to alignment offset. Decrease in manufacturing yield due to machining imperfections and difficulty with fiber alignment makes production of wafered FFP filters for applications requiring a FSR greater than about 100 nm impractical.

The present invention provides improved FFP filter design, particularly for high FSR applications, which overcome the problems encountered in FFP filters having watered cavities. In addition, the invention provides wafered FFPs with lower light losses and decreased sensitivity to alignment offset. These improved designs rely generally on shaping or contouring of at least one of the fiber ends that form the FFP cavity. More specifically, as described in more detail below, a mirrored fiber end of the FFP cavity is shaped so that the fiber core end and the fiber cladding end of the fiber end are shaped or contoured differently. Preferably the fiber core end is concave and the fiber cladding is flat, convex or concave with a curvature that is different from that of fiber core end.

It is known in the art to shape fiber ends in fiber couplers, for example, to decrease pressure at the end faces of the fibers and decrease light loss (U.S. Pat. Nos. 5,887,099; 5,796,894) by use of a planar undercut or to reduce back reflection (U.S. Pat. No. 5,037,176) by providing the fiber end with a concave polish. It is also known in the art to employ convex spherical shaping (doming) at a fiber end in a coupler (see Background section of U.S. Pat. No. 6,113,469). Various methods are known in the art for shaping the end of a fiber. Typically, the fiber is inserted into a fiber ferrule and the ferrule end and fiber end may shaped by polishing or grinding methods known in the art of fiber optics.

U.S. Pat. No. 6,445,838, issued Sep. 3, 2002, relates to fiber Fabry-Perot resonators in which a plurality of fiber retainers are disposed on a substrate for mounting and aligning the fiber Fabry-Perot (FFP) resonator. A pair of "binders" are "disposed on the substrate . . . proximate selected opposed pairs" of fiber retainers. FIG. 4 of the patent illustrates the use of a concave mirror-coated fiber end in the formation of the FFP resonator. A "flat-concave" configuration and a "concave-convex" configuration are reported. The "flat-concave" configuration is reported to be a "very efficient resonator." FIG. 4 illustrates fibers having a concave end indicating the fiber core and the fiber cladding. It is noteworthy that no distinction is made in the patent between the shaping of the fiber core end and the fiber cladding end. FIG. 4 illustrates a continuous concave curve over the entire fiber end with no difference in curvature between the core end and the cladding end. In a configuration reported to be preferred, the curvature radius of the fiber end is made to "match the curvature of the wavefront" inside the cavity. The shaping of the fiber end is reported to limit the transmission loss of the resonator.

SUMMARY OF THE INVENTION

The present invention provides FFP filters in which at least one of the mirrored fiber ends that form the FFP resonance cavity has a fiber core that is shaped to be concave to provide a concave mirror at the fiber core end. In particular embodiments, one of the mirrors of the FP cavity is formed at a concave fiber core end. Concave shaping of the fiber core end functions to provide a concave mirror at the fiber core and provide beam shaping of light through the gap in the FP resonance cavity or the resonance cavity itself to decrease loss in the cavity and to decrease sensitivity of transmission through the cavity to alignment offset. The present invention provides embodiments having one or more concave fiber core ends wherein the gap between mirrors is the FFP resonance cavity. The present invention additionally provides FFP filters wherein at least one of the mirrored fiber ends that form the gap within the FFP cavity is formed at a fiber end in which the fiber cladding and the fiber core ends are differentially contoured. In an exemplary embodiment, the fiber core is provided with a concave end and the cladding is differentially shaped with respect to the contour profile of the core. Exemplary shapes for fiber cladding useable in the present invention include, but are not limited to, flat or planar shaped, convex and concave having curvature that is distinguishable from that of the fiber core. In an exemplary embodiment, the mirrors provided at one or both of the fiber ends are one or more thin layer reflective surfaces that conform to the shape or contour of the fiber end (i.e., the cladding end and the core end). In another embodiment, the contour profile of the fiber core end is selected to match the spatial distribution of the wavefront propagating through the cavity. More specifically, the radius of curvature of the concave fiber core end is selected to match the radius of curvature of the wavefront propagating through the cavity. Differential shaping of the fiber cladding and the fiber core end is beneficial because it provides for lower light losses, decreased sensitivity to fiber alignment mismatch and increased glitch free dynamic range (GFDR) of the filter.

In one embodiment, the present invention provides FFP filters in which the resonance cavity is formed directly between the aligned mirror-coated ends of optical fibers and in which at least one of the fiber ends has a concave fiber core end. The cladding of the fiber end having the concave fiber core end can be flat or planar, convex or concave, but when the cladding has a concave contour, the concave contour profile and/or curve of the fiber core end and the concave contour profile and/or curve of the cladding end are discontinuous at the boundary between the fiber core and cladding. In a specific embodiment, when the core and cladding of a fiber end are both contoured or curved to be concave, the concave contour profile of the fiber core end and that of the cladding end of the fiber can have curvature that is different and/or the concave curve of the fiber core end can be offset from that of the fiber cladding end. In one example, the curvature of the concave core and concave cladding is different if the radii of curvature of the concave core and concave cladding are different. In another embodiment, the curvature of the fiber core is the same as that of the fiber cladding, but the concave curve of the fiber core end is offset from that of the cladding (as illustrated in FIG. 8C). Exemplary FFP filters of this aspect of the present invention do not have a length of fiber extending substantially through the resonance cavity as is provided in wafered FFPs and, as such, are waferless. The optical fiber ends, including the end face of the fiber core and the end face of the cladding of the fiber are shaped as indicated above to provide beam shaping to decrease filter loss, to provide for increased glitch-free dynamic range and to decrease alignment sensitivity of the filter.

In specific embodiments, FFP filters are provided in which the mirror-coated fiber ends of the two fibers forming the filter are differentially shaped or contoured. A number of combinations of differentially shaped fiber end pairs are possible as illustrated in FIGS. 6a –j. In exemplary embodiments, however, both of the fibers of the FFP have mirror-coated concave fiber core ends. In specific examples of the present invention, include but are not limited to,: two concave fiber ends, both with concave core end and concave cladding end, but the core and cladding having different end curvature, are combined to form an FFP of this invention (FIG. 6a);

two fibers, both with concave fiber core ends and both with convex cladding ends are combined (FIG. 6b) to form an FFP of this invention.;

two fibers with a flat or planar cladding ends and concave fiber core ends are combined (FIG. 6c) to form an FFP of this invention.;

a fiber with a flat or planar cladding end and a concave fiber core end are combined with a concave fiber end in which the core and cladding ends are both concave, but have differential curvature (FIG. 6d) to form an FFP of this invention.;

a fiber with a flat or planar cladding end and a concave fiber core end are combined with a fiber end in which the core end is concave and the cladding end is convex (FIG. 6e) to form an FFP of this invention.; and a concave fiber end having a concave core and differentially curved concave cladding and a fiber with a concave core end and a convex cladding end (FIG. 6f) are combined to form an FFP of this invention.

The contoured fiber ends, fiber core ends and fiber cladding ends of the present invention provide a means of adjusting the spatial distribution of light in a Fabry-Perot resonance cavity. Methods and devices of the present invention providing a means of adjusting the spatial distribution of light passing through a Fabry-Perot resonance cavity are useful for reducing light loss in the cavity, minimizing device sensitivity to optical fiber misalignment and achieving high GFDR. The methods and devices of the present invention include other means of shaping the spatial distribution of light in a Fabry-Perot resonance cavity, such as use of wave guides and wafers having one or more contoured surfaces, preferably end surfaces.

A waferless FFP is formed by aligning the mirror-ended fibers which are held in alignment within a holder or by attachment to a substrate. Typically, the mirror-coated fiber ends are aligned with a selected spacing or gap between the fiber ends. This spacing or gap defines the FP cavity optical path length between the fiber ends. In fixed frequency filters, the spacing between the fiber ends is fixed. In tunable filters, the spacing between the fiber ends is selectably adjustable, for example by increasing or decreasing the distance between the ends by temperature tuning (e.g. to stretch or compress a substrate to which the fibers are attached by changing the temperature of one or more components comprising the filter, filter holder or filter alignment system), electromechanical tuning (e.g., by application of a voltage to a piezoelectric transducer mechanically attached to the fibers to change its length and change the relative spacing of the aligned fiber ends), or by other means known in the art (e.g., mechanical stretching or compression of a substrate). An exemplary ferrule holder which can be employed to align and tune FFP filters of this invention is illustrated in FIG. 2. In general, ferrule holders that have been employed in the art to align and tune wafered FFP filters are useful in the waferless FFP filter of this invention.

FFP waferless filters of the present invention are particularly useful for optical filtering applications requiring large FSR. Use of FFP resonance cavities formed by one or more concave, reflective fiber ends avoids the need for incorporating a waveguide or wafer for beam shaping and minimizing light loss in the resonance cavity. In these embodiments, beam shaping is achieved by incorporation of one or more reflective fiber ends having shaped fiber cores and cladding, particularly fiber core ends having a concave contour profile. Without the spatial requirements needed for incorporation of a wafer or waveguide in the resonance cavity, waterless FFP optical geometries of the present invention may employ substantially smaller resonance cavity optical path lengths than conventional wafer containing FFPs. As FSR is inversely related to resonance cavity optical path length, the waferless FPP optical geometry of the present invention is capable of providing high throughput, optical filters having a large FSR, preferably larger than 100 nm for some applications. Further, the waferless FFP optical geometry of the present invention allows for efficient fabrication of optical filters having very well characterized and reproducible spectral properties, such as resonance frequency, free spectral and bandwidth.

In another embodiment, the invention provides an FFP filter having a fiber wafer or waveguide within the FP cavity and wherein at least one of the mirrored fiber ends that are spaced apart to form a fixed or tunable FFP resonance cavity has a concave fiber core end. In this configuration, the concave fiber end functions to further decrease light losses already provided by the use of a wafer or waveguide and to decrease the sensitivity of the FFP to alignment offset. The fiber end having the concave fiber end is mirror-ended. An exemplary wafered FFP having fiber end shaping as discussed herein is illustrated in FIG. 5. A wafered or waveguided FFP has at least one mirror embedded between two fiber ends, one of which is the internal end of a fiber and the other is the external end of a fiber wafer or waveguide (typically by deposition on an internal fiber end, followed by alignment with and attachment to (e.g., using epoxy) to the external fiber end of the wafer). In a single-cavity wafered or waveguided FFP, a second mirror-ended fiber is aligned facing the internal fiber end of the wafer or waveguide and a fixed or selectively adjustable gap is formed between the mirror-ended second fiber and the internal end face of the fiber wafer or waveguide (which is not mirror-coated). In this configuration, the mirror-ended second fiber end has a concave fiber core end. In an alternative single-cavity wafered or waveguided FFP, the wave-guide or wafer may have a reflective surface, which is operationally coupled to a fiber end having curvature or no curvature. The cladding at the mirrored-end of the second fiber can be flat or planar, convex or concave, but with differential curvature from that of the concave core end. The internal fiber end of the wafer or waveguide which is not mirror-coated may be flat, planar, convex or concave. Use of a wafer or waveguide having a curved fiber end may be useful for shaping the beam propagating through the resonance cavity. For example, use of a wafer or waveguide having a fiber end having a contour profile matching the radius of curvature of the wavefront propagating through the cavity may reduce sensitivity to fiber misalignment and minimized the loss of light in the resonance cavity. Further waveguides useable in this aspect of the present invention may comprise optical fiber, such as single mode optical fiber, having one or more contoured core ends and/or one or more contoured cladding ends. Contoured core ends and cladding ends of waveguides in useful in this aspect of the invenion may have any contour profile resulting in improved optical performance, such as decreased light loss, increased GFDR and reduced sensitivity to fiber misalignment.

The present invention includes FFP filters having multiple resonance cavities, which are formed by the introduction of wafers and waveguides into FFPs. These FFPs may contain one or more, but typically contain two, wafers or waveguides. In these cases, the multiple cavities are formed from one or more embedded mirrors and one or more mirrors at fiber ends. As in the single cavity FFP, in a multiple cavity FFP the mirror-ended fiber end which forms an FFP resonance cavity has a concave fiber core end. A multiple cavity FFP may contain two mirror-ended fibers that are shaped as described herein to have a concave fiber core end. The cladding of the fiber end having the concave fiber core end may be shaped to be planar, convex or concave, but with concave curvature that is discontinuous at the fiber core end and the fiber cladding end. The curvature of the cladding end and that of the core end are different. The combination of differentially shaped core and cladding decreases the sensitivity of the FFP to alignment offset, decreases loss and provides for increased glitch-free dynamic range.

In specific configurations, waferless FFPs are provided in which both of the fibers forming the FFP have mirrored concave fiber cores ends. In these configurations the cladding of the fiber ends can be flat or planar, convex or concave with curvature that is discontinuous from that of the fiber core ends. Specific configurations include: one in which the cladding of both ends are planar, one in which the cladding of one end is planar and the other concave, one in which the cladding of one end is planar and the other convex; one in which the cladding of both ends are convex, one in which the cladding end of one end is convex and the other concave; or one in which the cladding of both ends are concave, but in which the curvature of the fiber core ends and that of the cladding ends are discontinuous.

In one aspect, the present invention includes FFPs comprising at least one reflective internal fiber end with a fiber core end characterized by a first contour profile and a fiber cladding end characterized by a second contour profile, wherein the first contour profile and the second contour profile are different. As used herein, the term "contour profile" refers to the three dimensional spatial orientation of a surface, such as the surface of a fiber core end, the surface of a fiber cladding end, the surface of a fiber end, the surface of a wafer or the surface of a waveguide. Contour profiles of the present invention may be recessed or concave, wherein the contour profile is such that the surface bends away from a defining plane, such as a plane which is positioned orthogonal to the optical axis of a resonance cavity. Alternatively, contour profiles of the present invention may be convex, wherein the contour profile is such that the surface bends toward a defining plane, such as a plane which is positioned orthogonal to the optical axis of a resonance cavity. Further, contour profiles useable in the present invention may be planar or flat, wherein the contour profile is such that the surface is substantially parallel to a defining plane. In preferred embodiments, deviations from absolute parallelism are less than about 10%, more preferably less than about 5%.

Contour profiles of the present invention may be continuous surfaces or discontinuous surfaces. Alternatively, contour profiles useable in the present invention may be characterized by both continuous regions and discontinuous regions. Contour profiles useable in the present invention may be substantially symmetrical about an axis, such as the fiber axis or the optical axis of the resonance cavity. In embodiments of the present invention providing minimized light loss in the resonance cavity and decreased alignment sensitivity, deviations from absolute symmetry about the fiber axis is less than 10% and more preferably less than 5%. Alternatively, the present invention includes embodiments having contour profiles which are asymmetrical with respect to an axis, such as a fiber axis or the optical axis of a resonance cavity.

Contour profiles useable in the present may be characterized by a wide variety of mathematical relationships between position variables (x, y and z) including, but not limited to, exponential functions, hyperbolic functions, linear functions, logarithmic functions, spherical functions, elliptical functions, quadratic functions, polynomial functions, or any combination of these functional relationships. For example, contour profiles of the present invention may be characterized by a variety of three dimensional shapes including, but not limited to, cones, elliptical cones, planar surfaces, hyperboloids, hyperboloid segments, hyperboloid caps, hyperboloid cones, ellipsoids, ellipsoid segments, ellipsoid caps, ellipsoid cones spherical segments, spherical cones, spherical caps, cylinders, conical frustums, and pyramidal frustums. As will be understood by a person skilled in the art of the fabrication of fiber optic components and devices, it is very difficult to produce fiber cores and cladding having a contour profile characterized by any one absolute geometric shape or functionality, such as those functional relationship and shapes described above. Accordingly, the present invention includes embodiments having contour profiles of surfaces, such as the fiber core ends, fiber cladding ends, fiber ends, wafers and waveguides ends, which deviate from a selected absolute geometric shape or functionality, preferably exhibiting deviations less than about 10% and more preferably less than about 5%.

In another aspect, the present invention includes FFPs comprising at least one internal reflective fiber end with a fiber core end and a fiber cladding end characterized by similar contour profiles. In this embodiment, fiber core and fiber cladding have substantially the same contour profile but are oriented such that the combination of their surfaces does not result in a single continuous surface. Rather, the combination of the internal surface of the fiber core end and the internal surface of the fiber cladding end is discontinuous in the region where the two surfaces intersect. In an exemplary embodiment, the internal surface of the fiber core end is offset from the internal surface of the fiber cladding end by a selected offset distance. In another exemplary embodiment, one or more additional surfaces are disposed between the internal surface of the fiber cladding end and the internal surface of the fiber core end. In this embodiment, the additional surfaces may be characterized by one or more contour profiles which are different from the contour profile of the internal ends of the fiber core and cladding.

In an exemplary embodiment, the single cavity and multiple cavity FFPs of this invention are formed by introducing the fibers with contoured fiber core ends into alignment holders in which the cores of the fibers can be aligned to maximized light transmission through the cavity and where alignment can be maintained. Alignment fixtures, systems or holders can hold the fibers in a substantially fixed relationship to form a selected, fixed gap and resonance cavity optical path length. Any means of aligning optical fibers may be used in the present invention, such as use of fibers bonded or fixed to selectably positionable substrates, use of fiber ferrule alignment systems and use of tunable alignment systems. Alternatively, alignment fixtures, systems or holders may provide a means for selectably adjusting the FP resonance cavity optical path length, typically by changing the length of the gap between fiber ends. Any means of selectably adjusting the optical path length of light through the resonance cavity may be used in the present invention. Most simply, the holder itself or a portion of the holder, can change length responsive to a stimulus, such as a change in temperature, change in pressure, a mechanical stretching or compressing force, or the application of voltage, and as a consequence of its change in length change the length of the cavity.

The present invention further provides optical devices which incorporate one or more FFPs of this invention.

Optical devices of the present invention include, but are not limited to, tunable lasers, optical spectrum analyzers, wavelength or frequency analyzers or detectors, optical performance monitors, wavelength references, particularly those providing a comb of wavelengths, sensors and sensing devices (e.g., to detect changes in temperature, pressure, mechanical stretching or compression or the like), multiplexers and demultiplexer, optical signal generators, dense and coarse wavelength division multiplexers and demultiplexers, light filters, optical sources, detectors, fiber optic routing devices, optical alignment systems, add/drop filters and interferometers and more generally any optical devices known in the art to be implemented or capable of implementation employing a wafered or waveguided, tunable or fixed FFP. The FFP filters of this invention are preferred for applications in fields such as telecommunications, optical filtering, optical sensing, which benefit from the use of an FFP filter, particularly a FFP filter having large FSR.

BRIEF DESCRIPTION OF THE DRAWINGS

FIG. 3A is a representative spectrum of the output of an FFP filter illustrating the definitions of free spectral range (FSR), band width (BW) and finesse ($\mathcal{F}$).

FIG. 3B illustrates the definition of the glitch free dynamic range (GFDR) of a filter employing a representative filter output.

DETAILED DESCRIPTION OF THE INVENTION

Figure 1:
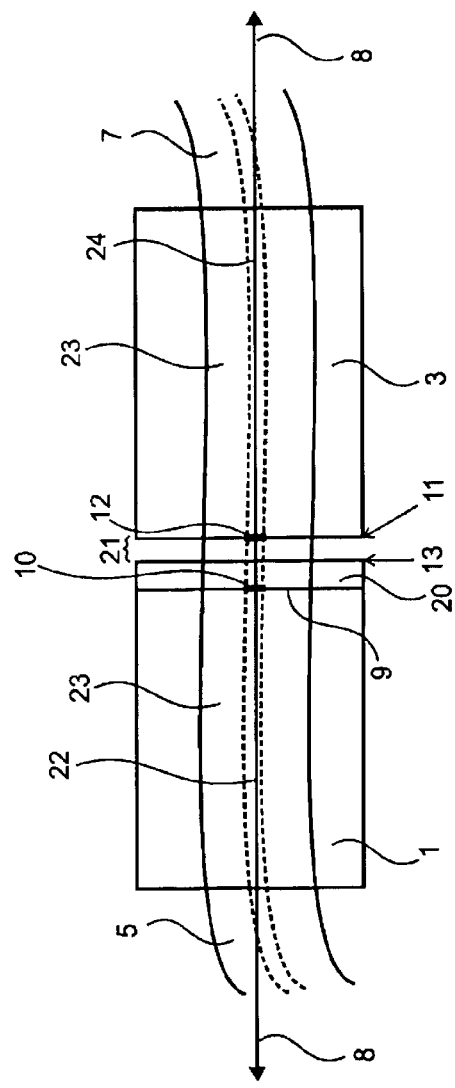
FIG. 1 is a schematic illustration of a conventional single cavity wafered FFP filter.
Figure 2:
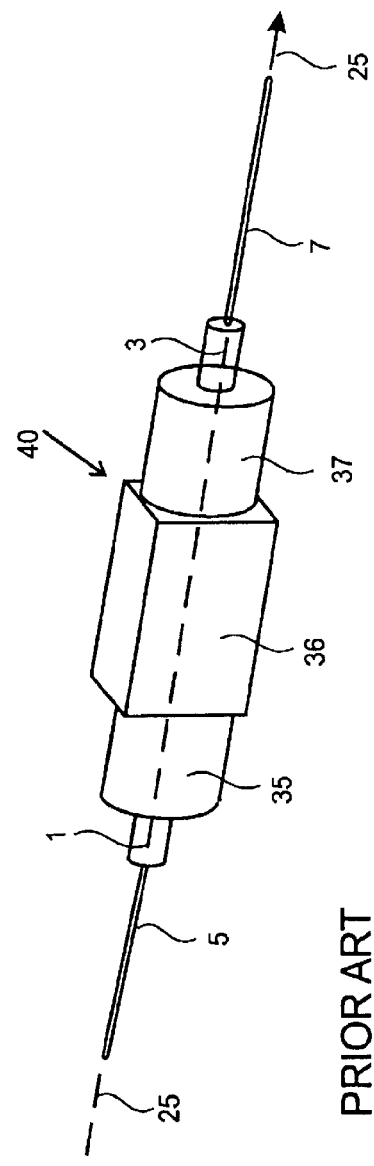
FIG. 2 schematically illustrates a prior art ferrule holder alignment fixture that can be used to align and maintain the alignment of FFP filters of this invention. The holder can be provided with a piezoelectric transducer to change the length of the FFP cavity.

The terms free spectral range, bandwidth and finesse are used generally as they are used in the art. FIG. 3A illustrates the definitions of these terms in an exemplary spectrum. Those of ordinary skill in the art will appreciate that the definitions of these terms may depend on the shape of the peaks in the spectral output of the filter.

For descriptions herein an optical fiber has an internal end face and an external end. The internal end is the fiber end that is closest to the fiber gap within the FFP cavity. Thus, two internal fiber ends are aligned and spaced apart to form the gap within the FFP. A fiber contains a substantially axial longitudinal core surrounded by a cladding layer. Fiber Fabry-Perot filters of this invention are formed between mirrors at the internal ends of two fibers, between a mirror embedded between two fiber ends and one at an internal fiber end or between two embedded mirrors. Mirrors are typically formed at fiber ends by deposition of one or more thin films, such as thin dielectric films, metallic films, salt films and semiconductor films. As used herein the term mirror is intended to encompass any reflective surface, layer or plurality of layers. In an exemplary embodiment, the mirror or reflective surface is provided as one or more thin film layers that conforms to the shape or contour of the fiber core end or cladding core end upon which it is formed. In preferred embodiments the reflectivities of the mirrors forming the FFP cavity are high reflectivity, preferably having a reflectivity greater than 90% and more preferably greater than 98%. Fiber ends are spaced apart to form an air gap, and one or both of these fiber ends forming the gap can be coated with a mirror. In an exemplary embodiment, at least one of the mirror-coated fiber ends which form the gap or the cavity has a fiber core end that is concave which provided a concave mirror at the fiber core. The length of the air gap can be changed to change the length of the FFP resonance cavity and, thus, selectably adjust the wavelengths of light transmitted by the filter. The internal fiber ends are opposed with fiber cores aligned to maximized light passage through the fibers across the gap.

FFPs of this invention can be formed between two mirror-ended fibers wherein one or both of the fiber ends are shaped or contoured as described herein for improved optical properties of the filter. The fiber ends in this case form a fiber gap, which is the FFP resonance cavity. The fiber ends form one or two concave mirrors at the fiber core ends of the fibers. FFPs can be formed in which both mirror-ended fiber ends have concave fiber cores. The cladding end of the mirror-ended fiber ends that form the gap cavity can be contoured or shaped differently from the fiber core end. The cladding end of a fiber may be convex or flat or may be concave, but with a curvature that is measurably different from that of the concave core end of the fiber. In all cases mirrors formed at the shaped or contoured fiber ends conform to the shape or contour of the fiber core or cladding ends.

The term concave is used broadly to describe an end surface of a fiber, fiber core or fiber cladding that curves away from a reference surface. For purposes of this application we define the reference surface as a plane perpendicular to the longitudinal optical axis of the FFP resonance cavity (see, element 8 in FIG. 1). As noted above, the terms internal and external when applied to fiber ends herein refer to ends that are toward the fiber gap and those that are away from the fiber gap, respectively. Fiber ends are defined for bare fibers, for fibers which may be held with the axial bore of a ferrule or for fiber-containing wafers (portions of ferrules of precisely selected length for use within FFP cavities) or fiber containing waveguides. The internal and external ends of fibers, wafers or waveguides are defined relative to each other, with the internal end being the end that is closest to the fiber gap within the FFP. A concave surface at an internal end of a fiber wafer or waveguide at the fiber core or the fiber cladding end curves away from the reference plane towards the external end of the fiber. Analogously, the fiber cladding ends of optical fibers employed in FFP of this invention may be planar or curved. Curved fiber cladding ends may be concave or convex. The term concave in reference to the shape or contour of a fiber cladding has the same meaning as applied herein to fiber core ends. The term convex is used broadly herein to describe an end surface of a fiber, fiber core or fiber cladding that curves outward towards the reference plane in the fiber gap. In specific embodiments, the concave and convex shapes of the fiber core ends or the fiber cladding ends are typically symmetrical with respect to the axis of the fiber core on which they are formed.

Figure 5:
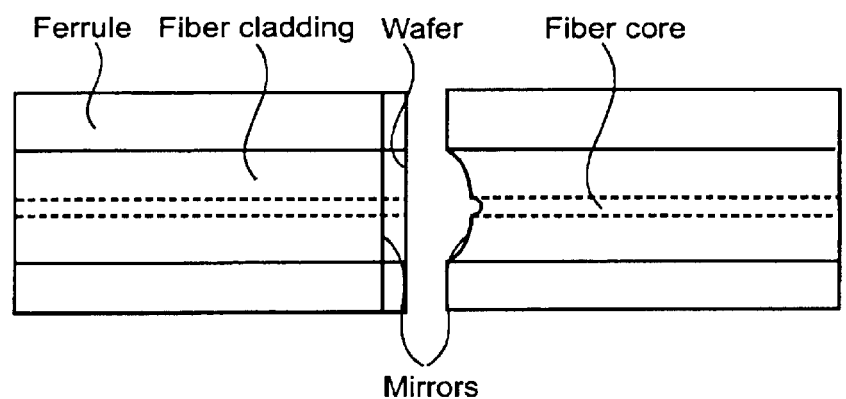
FIG. 5 is a schematic drawing of an exemplary wafered FFP filter having a mirror-ended fiber in which the fiber end has a double concave cross-sectional profile where the concave curve of the fiber core end is not continuous with (is discontinuous with) the concave curve of the fiber cladding end. In this case the FFP cavity is formed between and embedded mirror and a mirror at the fiber end.
Figure 6A:
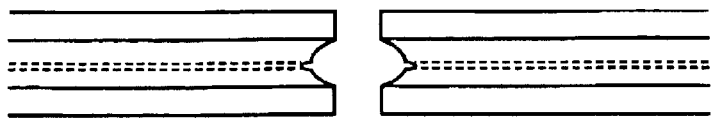
FIGS. 6a–f and h–j illustrate cross-sectional profiles of different fiber ends for use in FFPs of this invention. Profile g combines two concave shaped fiber ends in which the concave shape is continuous. Profiles c–f are preferred profiles for some applications.
Figure 6B:
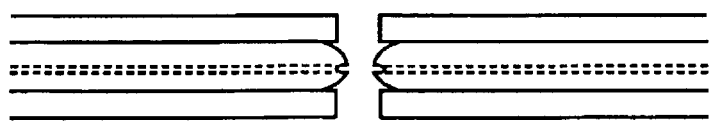
Figure 6C:
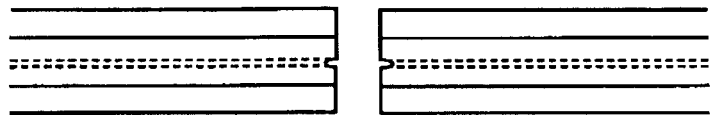
Figure 6D:
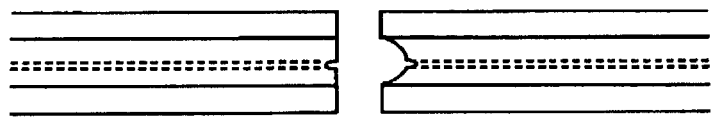
Figure 6E:
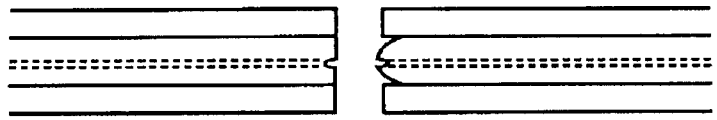
Figure 6F:
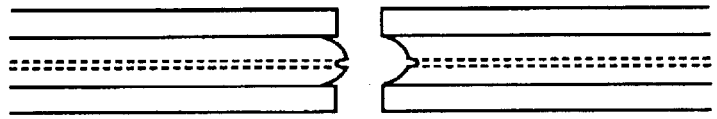
Figure 6G:
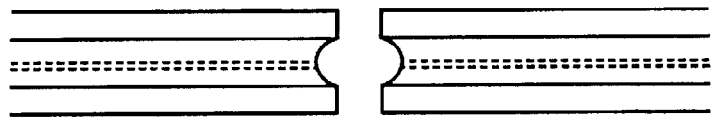
Figure 6H:
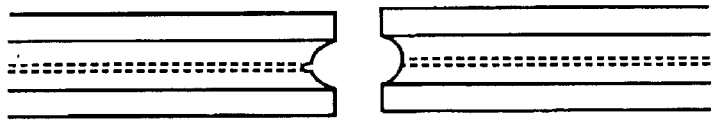
Figure 6I:
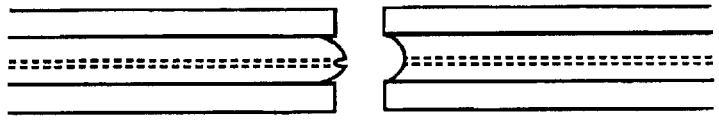
Figure 6J:
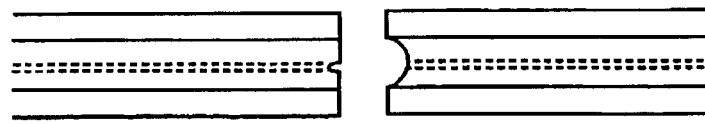
Figure 6C:
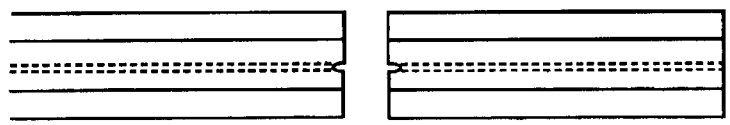
Figure 6D:
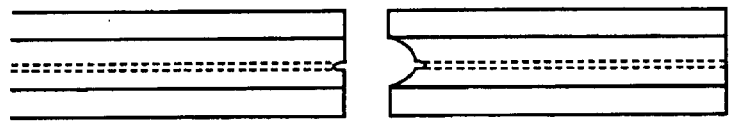
Figure 6E:
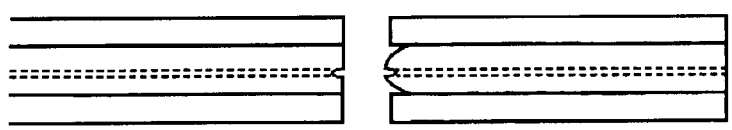
Figure 6F:
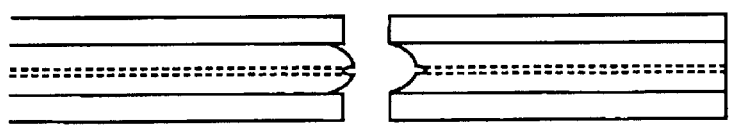
Figure 7:
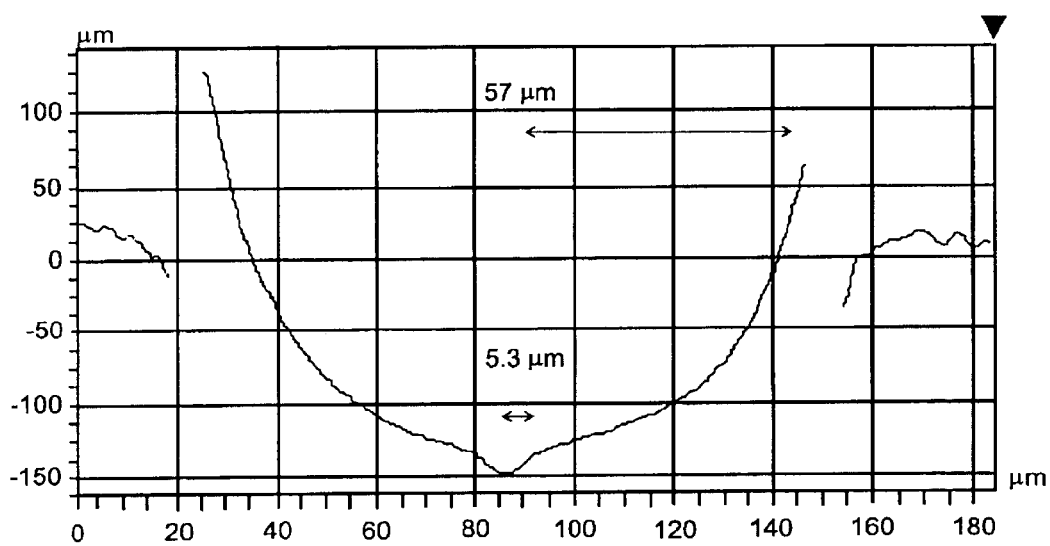
FIG. 7 an experimentally determined cross-sectional profile of a fiber end having a double concave profile.
Figure 8A:
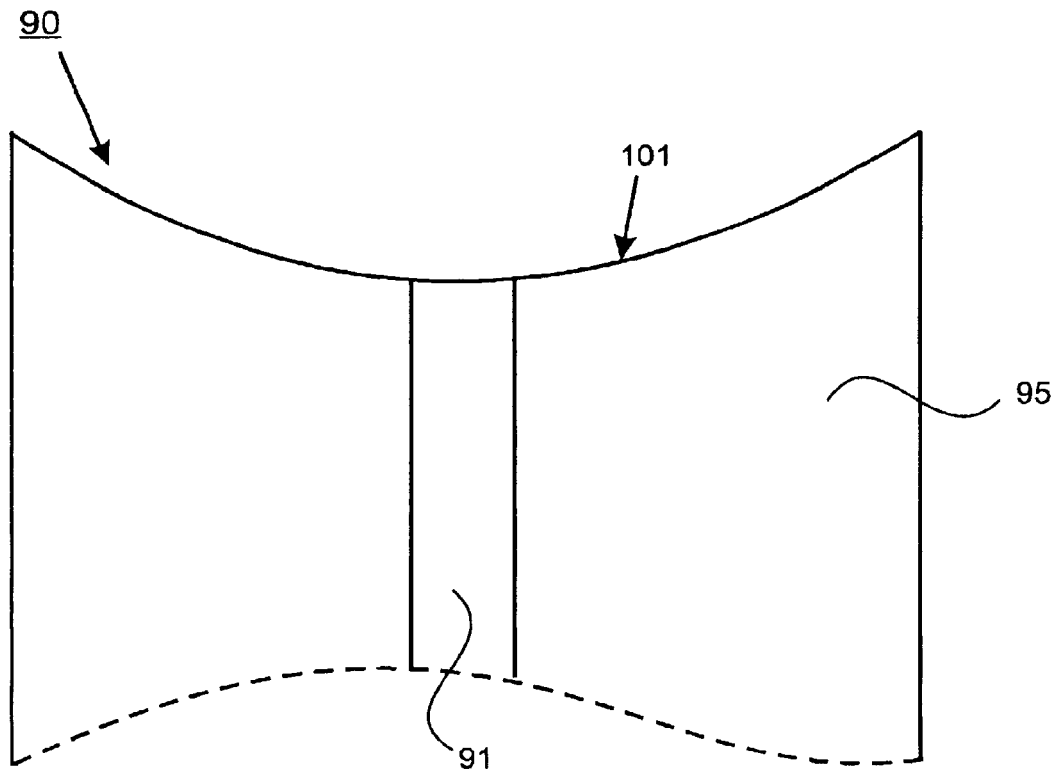
FIGS. 8A–C illustrate the difference between concave core and cladding ends that are continuous (8A) and exemplary concave cores and claddings that are discontinuous (8B and 8C).
Figure 8B:
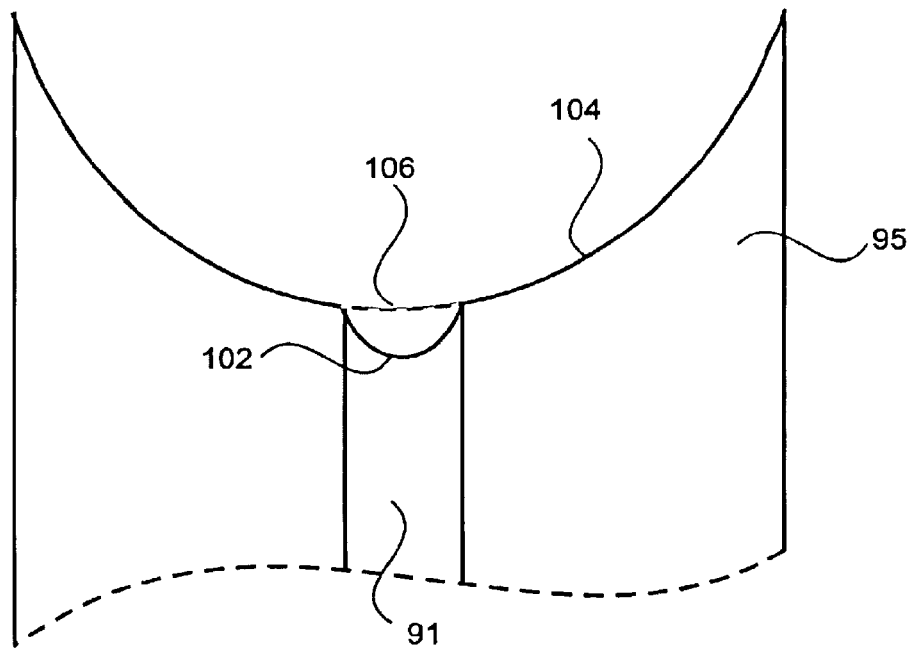

The shape or curvature of the fiber cladding end and/or the fiber core end is illustrated by cross sectional profiles, as shown in FIGS. 4A, 4C, 5, FIGS. 6a–f and h–j, and FIGS. 8B and C. FIG. 7 illustrates an experimentally measured fiber end contour profile. Cross-sectional profiles of fiber ends can be measured using optical profiling techniques, see for example optical profiling instruments of Veeco Instruments, Woodbury N.Y.

In preferred embodiments, the core and the cladding ends have different curvature—where the term curvature includes concave or convex curves and/or flat surfaces (where the curvature is 0). The shape of the cladding and the core ends are preferably cylindrically symmetrical around the axis of the fiber core, but unsymmetrical shaping is also encompassed within this invention. The concave shape of the fiber core end profile can be a smooth and symmetric shape, e.g., spherical, cylindrical, elliptical or parabolic or to may have a curve shape that can be described as a combination of such shapes. The profile of the concave fiber core shape may exhibit sharp or smooth transitions between curve shapes, including the transition between a flat cladding and a concave core. It is preferred that all transitions between curve shapes on the cladding and core are smooth transitions without sharp edges which can degrade optical performance of the filters. Smooth transitions include those in which the radii of the core and cladding are blended using a third radius such that all radii endpoints are tangential. As is known in the art for flat fiber endfaces, the shaped or contoured end faces of this invention are preferably polished to have an optical grade finish.

In general it has been found that improved optical performance (i.e., decreased light loss or improved glitch free dynamic range (GFDR)) are obtained when there is a discontinuity between the contour or curvature of the fiber core end and that of the fiber cladding end. The term discontinuity is intended herein to refer to an inflection in the curve or contour of the end face at the transition or boundary between the core and the cladding. The discontinuity can be between a convex or flat (planar) cladding end and a concave fiber core. The discontinuity can also be between a concave cladding end and a concave core end, where the curvature of the core and cladding do not form a continuous curve, where the curvature of the core and the cladding are different and/or where the concave curve of the core is offset from that of the cladding. In a specific embodiment, optical improvements are obtained when there is a difference in radius of curvature between the fiber core end and that of the fiber cladding end of a fiber end. The difference in radii can be between a convex or flat (planar) cladding end and a concave fiber core. The difference in radii can also be between a concave cladding end and a concave core end where the curvature of the core and cladding do not form a continuous curve with constant radius of curvature. In another embodiment of the present invention, optical improvements are obtained when the core and cladding of a fiber end have about the same radius of curvature but are offset from another by a selected distance. The radius of curvature of a contoured core or cladding end can be measured using optical profiling methods that are known in the art, such as microscopy, atomic force microscopy and scanning tunneling microscopy. Methods are known in the art for determining the radius of curvature of a curve or a portion of a curve, for example, by fitting circles to the curve or the portion of a curve.

Figure 8C:
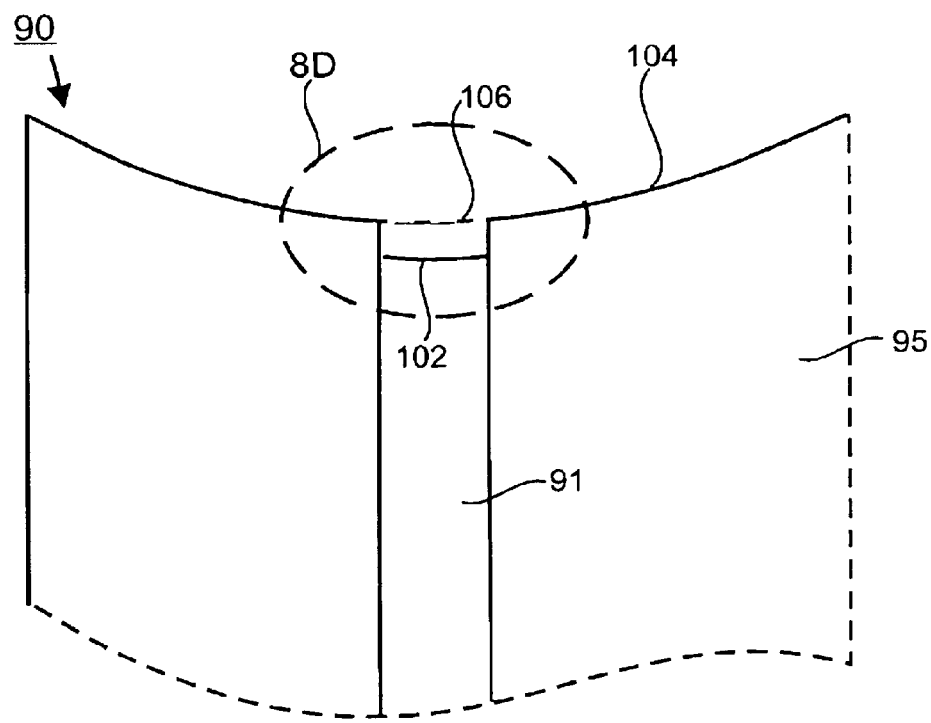
Figure 8D:
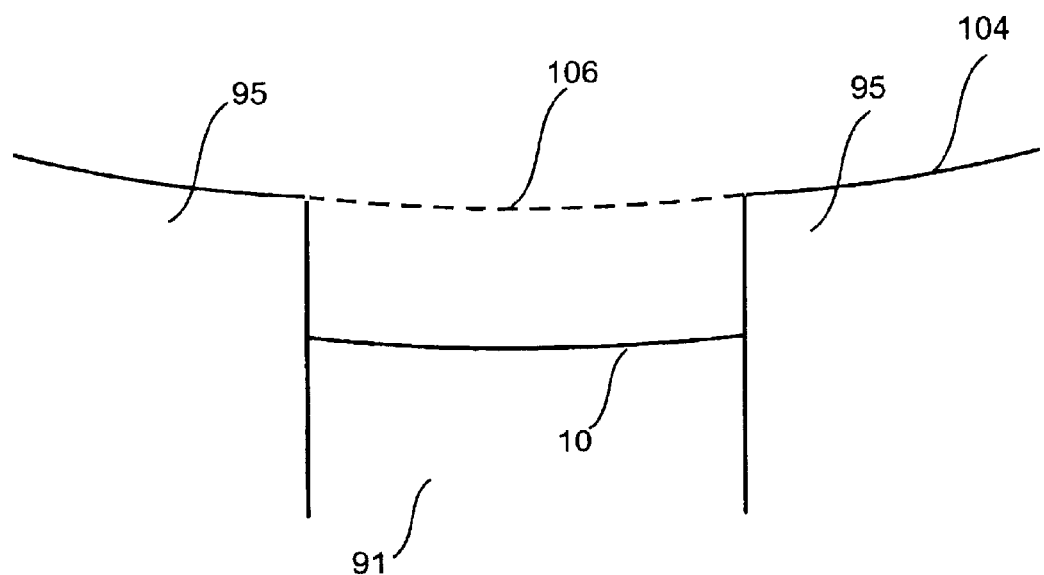

Examples of concave cores and claddings in which the radius of curvature of the core and the cladding are different are provided in FIGS. 8B and C. FIG. 8A illustrates the case where the radius of curvature of the core and the cladding are the same. FIG. 5A illustrates in a cross-sectional profile of a fiber (90) end where the concave curve of the core (91) and cladding (95) ends form a continuous concave curve (101). FIGS. 8B and 8C illustrate examples where the concave curve of the core end and that of the cladding end do not form a continuous curve. The curve of the concave end of the fiber core (102) and the curve of the concave end of the cladding (104) are illustrated in cross-sectional profile. The smooth continuation of the curve of the cladding through the core (106) is indicated as a dashed line in both FIGS. 8B and 8C. In the illustration of FIG. 8B, the concave curve of the core (102) is not super-imposable upon the continuation of the curve of the cladding end (106). In the illustration of FIG. 8C, the concave shape of the core (102) is super-imposable over that of the continuation of the curve of the cladding (106), but the curve of the core is offset from that of the cladding end. Note that an additional larger scale illustration of FIG. 8C (enlarged) is provided to emphasize that the curve of the core end in FIG. 8C, while shallow, is concave.

The waferless design of this invention has only an air gap inside the cavity, yet has improved performance especially for applications that require a wide free spectra range (FSR) of over 100 nm (12000 GHz) compared to FFPs having a wafer or waveguide positioned in the FFP resonance cavity. As shown in FIG. 6a–f and h–j, for example, the concave FFP filter has mirrors that have a concave profile in core area, in contrast to the flat or convex mirrors in a prior art wafered FFP filter (FIG. 1). The concave mirror in the fiber core (formed by deposition of a thin film mirror on the concave fiber core end) is the key factor to achieve low loss and high finesse (F>2,000 and preferably F>5,000) since the mirror itself functions as a beam shaper inside the cavity.

Fiber ends can be shaped and contoured as described herein using conventional grinding and polishing techniques. In a preferred method, fibers are introduced into the axial bore of fiber ferrules prior to shaping of the fiber end face. For optical fibers that have cores that are softer than their cladding, the double concave core can, for example, be readily obtained by final polishing of the fiber endfaces with slurry on a soft polishing cloth. Final polishing is performed after regular polishing to form a flat fiber end using polishing films typically of either cerium oxide or diamond. Final polishing, for example, of a Corning SMF-28 fiber with ceria or silica based slurries results in a concave profile in the fiber core area. If fiber ends are polished to shape while held within a ferrule, particularly when using slurry polishing, the type of ferrule material used may affect the contour formed at the end face. In some cases, for example, in shaping of a Corning SMF-28 fiber end with ceria or silica based slurries a concave profile in the fiber core area if formed regardless of the ferrule materials employed. Depending on the initial shape of the fiber endface, the final polish process (e.g., polishing materials used) and material properties of ferrule and fiber, the cladding profile can be selected to be flat, concave, or convex.

When applying polishing techniques to make the fiber ends of this invention, the ferrule material employed (e.g., ceramic or glass) and the particular polishing process (polishing material, etc.) in the shaping process can effect the cladding profile that can be obtained. For ferrule materials, such as ceramic (Zirconia), that are harder than the fused silica, that forms optical fibers, a concave cladding shape can be readily achieved. Convex and flat cladding profiles can also be made using ceramic ferrules, depending on the initial polish profile of the fiber end and the pressure, time and materials used in the final polish process. Note that the initial or starting polish profile of the fiber end may be different, e.g., flat (planar) or domed. The starting profile of the fiber end face can affect the shaped profile of the fiber end. Glass ferrules can result in either flat or convex cladding profiles.

When the same ferrule material is employed, the cladding profile achieved but polishing can be affected by many factors, such as polishing pressure, polishing time, and polishing agents. For example, the fiber cladding protrusion (convex) of borosilicate-ferruled pigtails can range from 10 nm to 500 nm from the ferrule surface depending on these final polish parameters (e.g., pressure and time).

The radius of curvature of the core can be varied using polishing techniques e.g. from over 12 mm to less than 0.3 mm. The radius of curvature of the fiber core end (RCC) can affect the properties of the filter. Experiments show that the RCC should be adjusted to about 1 mm or less (when using fibers with core diameters of 10 micron) to achieve low loss filters. The fiber end profile can be adjusted by selecting the initial profile of the fiber end, selecting the final polishing cloth and polishing agent, and by selecting the time and pressure for polishing.

Fiber ends with concave core profile as shown in (a)–(f) of FIG. 6 are all readily achieved by polishing methods applied to fibers with softer cores. Table 1 summarizes the relative advantages and disadvantages of several combinations of fiber end shapes.

Those of ordinary skill in the art will appreciate that a given fiber end contour profile, such as a fiber core contour profile and/or fiber cladding contour profile, with a can be introduced at a fiber end by incremental polishing and or grinding by various known techniques with periodic assessment of the profile using an optical profiler as is known in the art.

Fiber ends can also be shaped and contoured as described herein using laser and chemical etching techniques and by molding techniques such as those described in M. D. Salik; C. Nicolas, A. Carre' and S. J. Caracci "Fiber Fabry-Perot Interferometer for Optical Channel Monitoring (2002).

FIG. 7 shows a microscopic plot of a typical double concave fiber endface measured using an optical profiler e.g. Wyko® FOT (TM) (Veeco Instruments, Woodbury N.Y.). Measurements like those illustrated in FIG. 7 can be employed in combination with polish, grinding, etching and or molding techniques to generate fiber end profiles of selected shape, contours and radii of curvature. In the illustrated profile, the measured radius of the core is about 5.3 microns and the measured radius of the cladding is about 57 microns. Exemplary embodiments of the present invention have fiber core ends with a radius of curvature having a value selected over the range of about 1 micron to about 20 microns and have fiber cladding ends with a radius of curvature having a value selected over the range of about 5 microns to about 100 microns.

Figure 4A:
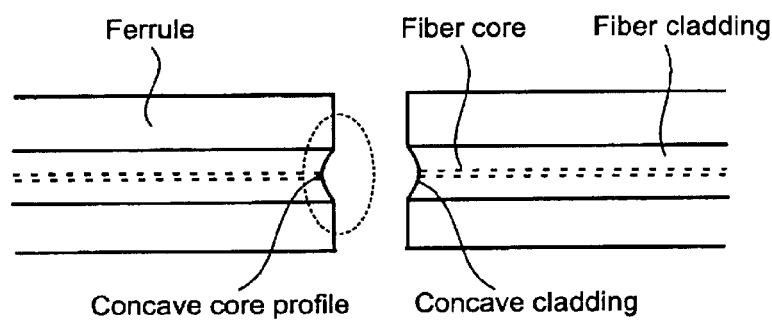
FIG. 4A illustrates a FFP formed by two mirrors with double concave cross-sectional profiles in core and cladding.
Figure 4B:
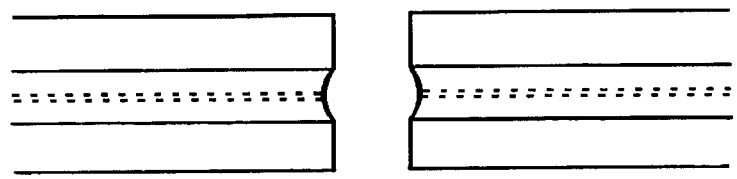
FIG. 4B illustrates an FFP formed by mirrors with single concave cross-sectional profile in core and cladding.
Figure 4C:
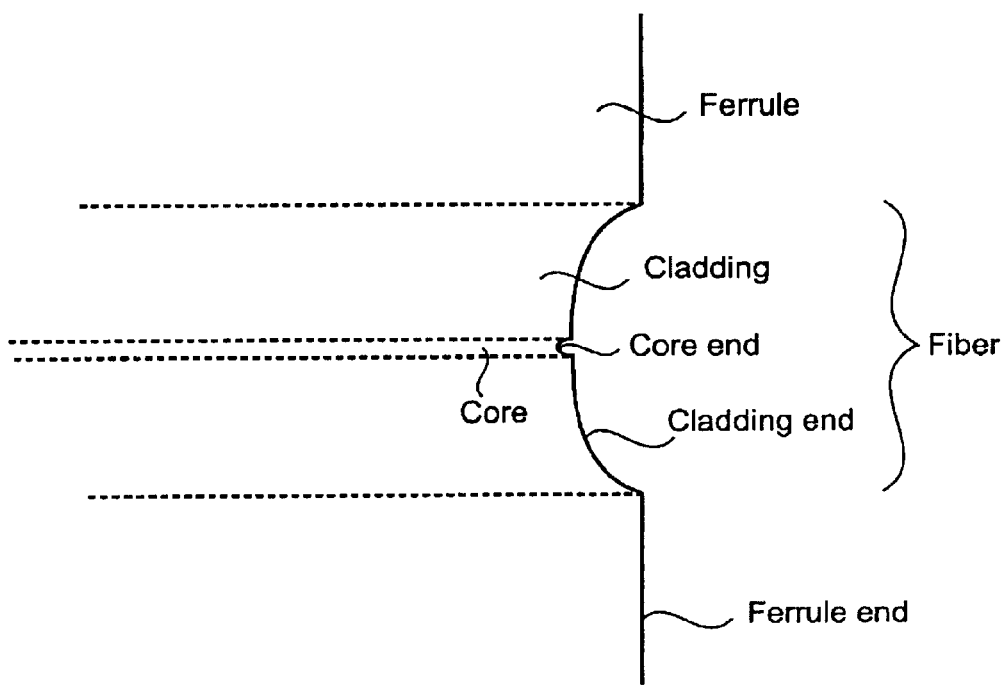
FIG. 4C is an expanded view of the cross-sectional profile of FIG. 4A.

With the same concave core profile different combinations of cladding profile result in different filter characteristics, loss, GFDR, and misalignment sensitivity. For example, filters with two concave claddings, as shown in FIG. 4A and FIG. 6a, can have low loss (<3 dB) and high finesse (F>4,000) even when two mirrors are separated apart by ~25 microns. GFDR of such filters with FSR of about 130 nm is relatively high, ~40 dB, but is relatively sensitive to angular misalignment. The strong beam shaping effect from the cladding results in high amplitude in the spurious spectral content or glitch.

To increase GFDR, and suppress the glitch amplitude, two convex shaped claddings can be used. In this case, GFDR can be as high as over 70 dB with non-detectable side-mode amplitude. However, in this design loss is much more sensitive to misalignment, and the filter can be (compared to other designs of this invention) more difficult to assemble in a fixture.

For FFP filters with reasonably good loss, GFDR, and misalignment sensitivity, the following cladding profile combinations, flat and flat, flat and concave, flat and convex, and convex and concave, are preferred. Filters with these cladding combinations can be easily aligned and constructed in fixtures. A drawback of convex claddings obtained by shaping of the ends of glass ferruled pigtails is that the fiber protrusion tends to damage the mirrors during filter assembly due to mutual impact. Therefore, a protruded convex cladding is better used in convex concave combination. It will also be appreciated that a fiber with a mirrored concave fiber core end can be combined with fibers in which the core end is not concave, but which have with flat, concave, domed (convex) or otherwise shaped fiber ends which can be readily prepared by known methods or are commercially available.

The use of mirrors with concave fiber core ends not only work well as a pair to form waterless filters, but also improves filter performance significantly when paired with a wafer, as shown in FIG. 5. Such a combination improves not only transmission performance of wafered filters with wide FSRs (up to 50000 GHz), but also reflection characteristics of wafered filters with smaller FSRs. Compared with a flat-core mirror, a mirror with concave core can increase GFDR of a wafered filter by 4~10 dB, decrease loss by 1~3 dB, and increase reflection contrast by 3~10 dB. By using a wafer and a flat-core mirror combination (the standard combination), it is difficult to achieve wide FSR filters with low loss and large GFDR in standard PZT fixtures. However, by changing the flat-core to a concave-core mirror, the loss misalignment sensitivity is improved significantly, and GFDR can be easily increased to 40 dB. The shaped fiber ends of this invention can be combined in other wafered FFP configurations which may for example contain two (typically) or more wafers. In each case, the FFP of the wafer or waveguided FFP will contain a fiber gap to allow adjustment of the cavity length (in a fixed filter configuration) or to allow tuning of the FFP. The shaped fiber ends of this invention are employed on one or both of the fiber ends (which optionally have a mirror coating) that form the gap in the FFP filter cavity. The use of the shaped Fiber ends described herein in the wafered and waveguided FFPs result generally in improvements in filter performance.

Those of ordinary skill in the art will appreciate that methods, materials and configurations other than those specifically exemplified herein can be employed in the practice of this invention as claimed without undue experimentation. For example, various methods for polishing, grinding and shaping a fiber end other than those specifically exemplified are known in the art and can be used to achieve the fiber end shapes described herein. Fiber core and cladding materials and ferrule materials other than those specifically exemplified herein are known in the art and can be employed in the practice of this invention. Alignment fixtures other than those specifically exemplified herein are known in the art and can be employed to align, maintain alignment and adjust the cavity length of FFP filters of this invention. Known functional equivalents of materials and methods specifically exemplified herein are intended to be encompassed by the invention.

All references cited herein are incorporated by reference herein in their entirety to the extent consistent with the present invention, in particular to provide additional examples of alignment fixtures, fiber core, cladding and ferrule materials and methods for selecting and adjusting the shape of a fiber end.

TABLE 1

Comparison of FFPs formed by mirrors with concave cores and different cladding profiles.

| Cladding combination | Advantage | Disadvantage |
| --- | --- | --- |
| Concave - concave | Low loss, Reasonable GFDR, | Misalignment sensitivity for GFDR, High glitch amplitude. |
| Convex - convex | Large GFDR, Reasonable loss, | Misalignment sensitivity for loss. Mirror touching. |
| Concave - convex | Reasonable loss, GFDR, and misalignment sensitivity. | |
| Flat - flat | Reasonable loss, GFDR, and misalignment sensitivity. | |
| Flat - concave | Reasonable loss, GFDR, and misalignment sensitivity. | |
| Flat - convex | Reasonable loss, GFDR, and misalignment sensitivity. | |

We claim:

1. A fiber Fabry-Perot filter comprising:
    a first reflective surface formed at a first optical fiber end having a fiber core end and a fiber cladding end, wherein said fiber core end has a core contour profile and said fiber cladding end has a cladding contour profile, wherein said core contour profile is a concave contour profile and said cladding contour profile is different from said core contour profile; and
    a second reflective surface positioned a selected distance from the first optical fiber end, thereby forming a Fabry-Perot resonance cavity between said first reflective surface and said second reflective surface.

2. The fiber Fabry-Perot filter of claim 1 wherein said second reflective surface is formed on a second optical fiber end having a fiber core end and a fiber cladding end, wherein said fiber core of said second fiber end has a core contour profile that is a concave contour profile and said cladding end of said second fiber end has a cladding contour profile that is different from said core contour profile of said second fiber end.

3. The fiber Fabry-Perot filter of claim 2 wherein said cladding contour profile of said second fiber end is a concave contour profile which is contoured differently than said core contour profile of said second fiber end.

4. The fiber Fabry-Perot filter of claim 3 wherein the concave contour profile of the fiber cladding end of said second fiber end and the concave contour profile of the fiber core end of said second fiber end are discontinuous at a boundary located between the fiber core and the fiber cladding of the second fiber end.

5. The fiber Fabry-Perot filter of claim 2 wherein said cladding contour profile of said second fiber end is a convex contour profile.

6. The fiber Fabry-Perot filter of claim 5 wherein the convex contour profile of the fiber cladding end of the second fiber end and the concave contour profile of the fiber core end of the second fiber end are discontinuous at a boundary located between the fiber core and the fiber cladding of the second fiber end.

7. The fiber Fabry-Perot filter of claim 2 wherein said cladding contour profile of said second fiber end is a planar contour profile.

8. The fiber Fabry-Perot filter of claim 7 wherein the planar contour profile of the fiber cladding end of the second fiber end and the concave contour profile of the fiber core end of the second fiber end are discontinuous at a boundary located between the fiber core and the fiber cladding of the second fiber end.

9. The fiber Fabry-Perot filter of claim 1 wherein said cladding contour profile is a concave contour profile which is contoured differently than said core contour profile.

10. The fiber Fabry-Perot filter of claim 9 wherein the concave contour profile of the fiber cladding end of the first fiber end and the concave contour profile of the fiber core end of the first fiber end are discontinuous at a boundary located between the fiber core and the fiber cladding of the first fiber end.

11. The fiber Fabry-Perot filter of claim 9 wherein the core contour profile has a first radius of curvature and the cladding contour profile has a second radius of curvature and wherein said first and second radii of curvature are different.

12. The fiber Fabry-Perot filter of claim 9 wherein the core contour profile has a radius of curvature which is equal to the radius of curvature a wavefront propagating through said Fabry-Perot resonance cavity.

13. The fiber Fabry-Perot filter of claim 9 wherein the core contour profile has a radius of curvature which is a value selected from the range of 12 millimeters to 0.3 millimeters.

14. The fiber Fabry-Perot filter of claim 1 further comprising a waveguide positioned in said Fabry-Perot resonance cavity, wherein said waveguide is positioned between said first and said second reflective surfaces.

15. The fiber Fabry-Perot filter of claim 14 wherein said waveguide is a segment of single-mode optical fiber.

16. The fiber Fabry-Perot filter of claim 14 wherein said waveguide is operationally coupled to said second reflective surface and wherein said second reflective surface is embedded between said wafer and a second optical fiber end.

17. The fiber Fabry-Perot filter of claim 14 wherein said waveguide has an internal end and an external end, wherein said internal end has a concave contour profile.

18. The fiber Fabry-Perot filter of claim 14 wherein said waveguide has an internal end and an external end, wherein said internal end has a convex contour profile.

19. The fiber Fabry-Perot filter of claim 1 wherein said Fabry-Perot resonance cavity has a selectably adjustable optical path length.

20. The fiber Fabry-Perot filter of claim 19 wherein said optical path length of said Fabry-Perot resonance cavity is selectably adjusted electromechanically.

21. The fiber Fabry-Perot filter of claim 20 further comprising a piezoelectric element positioned between said first and second reflective surfaces.

22. The fiber Fabry-Perot filter of claim 19 wherein said optical path length of said Fabry-Perot resonance cavity is selectably adjusted by temperature tuning.

23. The fiber Fabry-Perot filter of claim 19 wherein said second reflective surface is formed on a second optical fiber end and wherein said optical path length of said Fabry-Perot resonance cavity is selectably adjusted by changing the length of one or more substrates to which fibers having said first and second fiber ends are attached.

24. The fiber Fabry-Perot filter of claim 1 wherein said cladding contour profile is a convex contour profile.

25. The fiber Fabry-Perot filter of claim 24 wherein the convex contour profile of the fiber cladding end of the first fiber end and the concave contour profile of the fiber core end of the first fiber end are discontinuous at a boundary located between the fiber core and the fiber cladding of the first fiber end.

26. The fiber Fabry-Perot filter of claim 1 wherein said cladding contour profile is a planar contour profile.

27. The fiber Fabry-Perot filter of claim 26 wherein the planar contour profile of the fiber cladding end of the first fiber end and the concave contour profile of the fiber core end of the first fiber end are discontinuous at a boundary located between the fiber core and the fiber cladding of the first fiber end.

28. The fiber Fabry-Perot filter of claim 1 wherein said second reflective surface is formed on a second optical fiber end and wherein the optical fibers having said first and second optical fiber ends are held in ferrules.

29. The fiber Fabry-Perot filter of claim 28 wherein the ferrules holding the optical fibers having said first and second optical fiber ends are held with fiber cores aligned within a holder.

30. The fiber Fabry-Perot filter of claim 1 wherein said first reflective surface and said second reflective surface comprise a plurality of dielectric thin films.

31. The fiber Fabry-Perot filter of claim 1 wherein said first reflective surface and said second reflective surface comprise at least one metallic thin film.

32. The fiber Fabry-Perot filter of claim 1 having a free spectral range greater than or equal to 1100 nm.

33. The fiber Fabry-Perot filter of claim 1 wherein the optical path length between first and second reflective surfaces is about 25 microns.

34. The fiber Fabry-Perot filter of claim 1 having finesse greater than or equal to about 4,000.

35. The fiber Fabry-Perot filter of claim 1 having a glitch free dynamic range equal to about 40 dB.

36. The fiber Fabry-Perot filter of claim 1 having light loss equal to or less than about 3 dB.

37. The fiber Fabry-Perot filter of claim 1 further comprising at least one additional Fabry-Perot resonance cavity.

38. The fiber Fabry-Perot filter of claim 1 wherein said first reflective surface and said second reflective surface are separated by an air gap and wherein said air gap is said Fabry-Perot resonance cavity.

39. The fiber Fabry-Perot filter of claim 1 wherein said Fabry-Perot resonance cavity has a fixed optical path length.

40. A fiber Fabry-Perot filter comprising:
a first reflective surface formed at an first optical fiber end having a fiber core end and a fiber cladding end, wherein said fiber core end has a core contour profile and said fiber cladding end has a cladding contour profile, wherein said core contour profile and said cladding contour profile are concave contour profiles, and wherein the contour profile of the combination of said core contour profile and said cladding contour profile is discontinuous at a boundary located between the fiber core and the fiber cladding of the first optical fiber end; and
a second reflective surface positioned a selected distance from the first optical fiber end, thereby forming a Fabry-Perot resonance cavity between said first reflective surface and said second reflective surface.

41. The fiber Fabry-Perot filter of claim 40 wherein said core contour profile is offset from said cladding contour profile by a selected offset distance.

42. A fiber Fabry-Perot filter comprising:
a first reflective surface formed at an first optical fiber end having a fiber core end and a fiber cladding end, wherein said fiber core end has core contour profile and said fiber cladding end has a cladding contour profile, wherein said core contour profile is a concave contour profile and said cladding contour profile is different from said core contour profile;
a second reflective surface positioned a selected distance from the first optical fiber end, thereby forming a Fabry-Perot resonance cavity between said first reflective surface and said second reflective surface; and
a waveguide positioned between said first and second reflective surfaces having internal and external ends, wherein said internal end is operationally connected to said second reflective surface.

43. The fiber Fabry-Perot filter of claim 42 wherein said external end of said waveguide has a concave contour profile.

44. The fiber Fabry-Perot filter of claim 43 wherein said external end of said waveguide has substantially the same concave contour profile as the fiber core end of the first optical fiber end.

45. The fiber Fabry-Perot filter of claim 42 wherein said external end of said waveguide has a convex contour profile.

46. The fiber Fabry-Perot filter of claim 42 wherein said external end of said waveguide has substantially the same contour profile as the cladding contour profile of the first optical fiber end.

47. A method for improving the optical properties of a fiber Fabry-Perot filter in which the Fabry-Perot cavity is formed between two internal mirrored fiber ends which comprises the step of:
providing a concave mirror at the fiber core of at least one of the internal mirrored fiber ends.

48. The method of claim 47 wherein a concave mirror is provided at both internal mirrored fiber ends.

49. The method of claim 48 further comprising the step of:
providing a convex mirror at the cladding of one internal mirrored fiber end and providing a concave mirror at the cladding of the other internal mirrored fiber end; wherein the concave mirror of the core and that of the cladding of the same fiber end have different contour profiles.

50. The method of claim 49 wherein the concave cladding mirror and the concave core mirror have different radii of curvature.

51. The method of claim 48 further comprising the step of:
providing a flat mirror at the cladding of one internal mirrored fiber end and providing a concave mirror at the cladding of the other internal mirrored fiber end; wherein the concave mirror of the core and that of the cladding of the same fiber end have different contour profiles.

52. The method of claim 48 further comprising the step of:
providing a flat mirror at the cladding of one internal mirrored fiber end and providing a flat mirror at the cladding of the other internal mirrored fiber end.

53. The method of claim 48 further comprising the step of:
providing a convex mirror at the cladding of one internal mirrored fiber end and providing a flat mirror at the cladding of the other internal mirrored fiber end.

54. The method of claim 48 further comprising the step of:
providing a convex mirror at the cladding of one internal mirrored fiber end and providing a convex mirror at the cladding of the other internal mirrored fiber end.

55. The method of claim 48 further comprising the step of:
providing a concave mirror at the cladding of one internal mirrored fiber end and providing a concave mirror at the cladding of the other internal mirrored fiber end; wherein the concave mirror of the core and that of the cladding of the same fiber end have different contour profiles.

56. The method of claim 47 further comprising the step of:
providing a concave mirror at the fiber cladding of at least one of the internal mirrored fiber ends, such that the concave mirror of the core and that of the cladding of the same fiber end have curvature that is different.

57. The method of claim 56 wherein that the concave mirror of the core and that of the cladding of the same fiber end have different radii of curvature.

58. The method of claim 47 further comprising the step of:
providing a convex mirror at the fiber cladding of at least one of the internal mirrored fiber ends.

59. The method of claim 47 further comprising the step of:
providing a planar mirror at the fiber cladding of at least one of the internal mirrored fiber ends.

* * * * *